United States Patent
Olsson et al.

(10) Patent No.: US 12,529,442 B2
(45) Date of Patent: Jan. 20, 2026

(54) INWARD SLOPED DRUM FACE FOR PIPE INSPECTION CAMERA SYSTEM

(71) Applicant: SeeScan, Inc., San Diego, CA (US)

(72) Inventors: Mark S. Olsson, La Jolla, CA (US); David C. Parsons, San Marcos, CA (US); Andrew P. Corvin, San Diego, CA (US); Alexander L. Warren, Escondido, CA (US)

(73) Assignee: SeeScan, Inc., San Diego, CA (US)

( * ) Notice: Subject to any disclaimer, the term of this patent is extended or adjusted under 35 U.S.C. 154(b) by 701 days.

(21) Appl. No.: 17/815,387

(22) Filed: Jul. 27, 2022

(65) Prior Publication Data

US 2023/0038357 A1 Feb. 9, 2023

Related U.S. Application Data

(60) Provisional application No. 63/227,974, filed on Jul. 30, 2021.

(51) Int. Cl.
*F16L 55/46* (2006.01)
*B66D 1/30* (2006.01)
(Continued)

(52) U.S. Cl.
CPC ................ *F16L 55/46* (2013.01); *B66D 1/30* (2013.01); *B66D 1/36* (2013.01); *H04N 23/51* (2023.01);
(Continued)

(58) Field of Classification Search
CPC ...... F16L 55/46; F16L 2101/30; H04N 23/51; H04N 23/555; B66D 1/30; B66D 1/36
See application file for complete search history.

(56) References Cited

U.S. PATENT DOCUMENTS 5,754,220 A 5/1998 Smalser, Sr.
8,547,428 B1 * 10/2013 Olsson ............... G01N 21/8803
348/374
(Continued)

FOREIGN PATENT DOCUMENTS

EP 1296131 A2 3/2003
EP 3038965 A1 7/2016

OTHER PUBLICATIONS

International Searching Authority, "Written Opinion of the International Searching Authority" for PCT Patent Application No. PCT/US2022/074198, Oct. 26, 2022, European Patent Office, Munich.

*Primary Examiner* — Patrick E Demosky
(74) *Attorney, Agent, or Firm* — Steven C. Tietsworth, Esq.; Michael J. Pennington, Esq.

(57) ABSTRACT

Cable storage drum-reels, methods and systems are provided for deploying and retracting at least one push-cable with a distally mounted camera into and out of a pipe or cavity for applications such as plumbing and underground utility location. In an exemplary embodiment, a cable storage drum may include a centrally mounted axially projecting hub, and a housing to removably receive and rotatably support the cable storage drum. The housing may include an inside portion, and an outside portion with a front face and a rear face. The front face has an opening and is sloped inward toward the inside portion of the drum allowing a push-cable to be directed as desired into the cable storage drum and around the drum-reel. One or more cable guide points may be included for providing additional directional guidance of the push-cable into the drum and onto the hub.

22 Claims, 17 Drawing Sheets

(51) Int. Cl.
*B66D 1/36* (2006.01)
*H04N 23/51* (2023.01)
*F16L 101/30* (2006.01)
*H04N 23/50* (2023.01)

(52) U.S. Cl.
CPC ........ *F16L 2101/30* (2013.01); *H04N 23/555* (2023.01)

(56) References Cited

U.S. PATENT DOCUMENTS

| | | | |
|---|---|---|---|
| 11,148,184 B2* | 10/2021 | Chartier | B65H 75/42 |
| 2003/0142207 A1* | 7/2003 | Olsson | H04N 7/185 |
| | | | 348/84 |
| 2010/0208056 A1* | 8/2010 | Olsson | G01D 11/30 |
| | | | 348/84 |
| 2015/0055005 A1* | 2/2015 | Olsson | H04N 23/54 |
| | | | 348/333.06 |
| 2019/0284018 A1* | 9/2019 | Poulin | B65H 75/4484 |

* cited by examiner

INWARD SLOPED DRUM FACE FOR PIPE INSPECTION CAMERA SYSTEM

CROSS-REFERENCE TO RELATED APPLICATIONS

This application claims priority under 35 U.S.C. § 119(e) to U.S. Provisional Patent Application Ser. No. 63/227,974 entitled INWARD SLOPED DRUM FACE FOR PIPE INSPECTION CAMERA SYSTEM, filed Jul. 30, 2021, the contents of which are incorporated by reference herein in their entirety for all purposes.

FIELD

This disclosure relates generally to cable storage drum-reels, methods, and systems for inspection of pipes or cavities. More specifically, but not exclusively, this disclosure relates to cable storage drum-reels, methods, and systems for deploying and retracting at least one camera and additional cables and/or hoses into and out of a pipe or cavity for applications such as plumbing and underground utility location.

BACKGROUND

FIG. 1 illustrates the traditional method of deploying one or more cables or hoses into a pipe or cavity, as known in the prior art. Typically, a user such as a plumber or utility worker manually deploys or feeds one or more cables or hoses into a pipe or cavity. The cables or hoses are stored on a cable drum-reel. The drum-reel typically has a centrally mounted axially projecting hub for winding or unwinding the cables or hoses. In today's high-tech plumbing and utility service work, a camera is often deployed to give the worker a view of what is going on in the pipe or cavity. The camera is attached to the distal end of a push-cable which is a cable that is stiff or ridged enough to allow the camera to be pushed to a desired location within the pipe or cavity.

The drum-reel typically includes a housing or enclosure to help protect the cable during storage and deployment. The housing has a front and rear face, and the front face typically has an opening for the cable to enter or exit the drum. The front face is typically relatively flat or sloped outward, relative to the center of the hub. In this well known configuration, the cable may be manually pushed into the drum for storage. When a push-cable is used, although it is flexible enough to allow it to travel long distances relatively freely through pipes or cavities which are often curved or bent, the push-cable is resilient and "wants" to be straight. This means that when the cable is forced into the drum along the flat front face it will travel in a relatively straight line parallel to the face until it comes in contact with the outer surface edge or lip of the drum. This lip may be relatively straight or protrude outward, depending on the manufacturing process of the drum. The push-cable will continue towards the front inside of the drum until it comes in contact with an inside surface of the drum, at which point it will be forced to bend to follow the curve path of the drum. In this configuration the cable will not wind very uniformly and may randomly wind around the hub back and forth inside the drum between the front and rear face. It will not wind in a very efficient manner causing it to take up more space than necessary and causing additional wear and tear on the cable when the cable rubs back and forth across itself and when it rubs across the outside lip of the drum as it is entering and exiting the drum.

Accordingly, the present invention is directed towards addressing the above-described problems and other problems associated with cable storage drum-reels used for deploying one or more cables or hoses into a pipe or cavity.

SUMMARY

This disclosure relates generally to cable storage drum-reels, methods, and systems for inspection of pipes or cavities. More specifically, but not exclusively, this disclosure relates to a cable drum-reel with an inward sloped drum face which allows some control and guidance of the push-cable at a desired entry point into the drum-reel enclosure and at a contact point inside the enclosure. It also provides more efficient storage and deployment of the push-cable inside the drum-reel enclosure and around the hub of the drum-reel. Another advantage of an inward sloped drum face is a reduction in the forces placed on the push-cable inside the drum, thereby reducing wear and tear and extending the life of the push-cable. This reduction in forces placed on the push-cable also reduces the amount of effort a user needs to apply to the push-cable to deploy into, and/or retract the push-cable out of, the pipe or cavity and into and/or out of the cable-drum reel enclosure.

Depending on the amount of pressure the push-cable has on it inside the cable drum-reel enclosure, it may have a tendency to come out/jump out of the enclosure. This tendency is greatly reduced with an inward sloped drum face because of the reduced forces on the push-cable inside the enclosure.

In another aspect, the disclosure relates to a cable drum-reel with an inward sloped drum face and at least one cable guide-point for providing additional control and guidance when returning the push cable into the drum-reel enclosure.

In yet another aspect, the disclosure relates to a cable drum-reel with an inward sloped drum face and at least two cable guide-points for providing additional control and guidance when returning the push cable into the drum-reel enclosure.

Various additional aspects, features, and functions are describe below in conjunction with the Drawings.

Details of cable guide points, also known as cable guides, can be found in U.S. Provisional Patent Application Ser. No. 63/063,151, filed Aug. 7, 2020, entitled INSPECTION SYSTEM PUSH-CABLE GUIDE APPARATUS, the content of which is incorporated by reference herein in its entirety.

DETAILED DESCRIPTION

Figure 1:
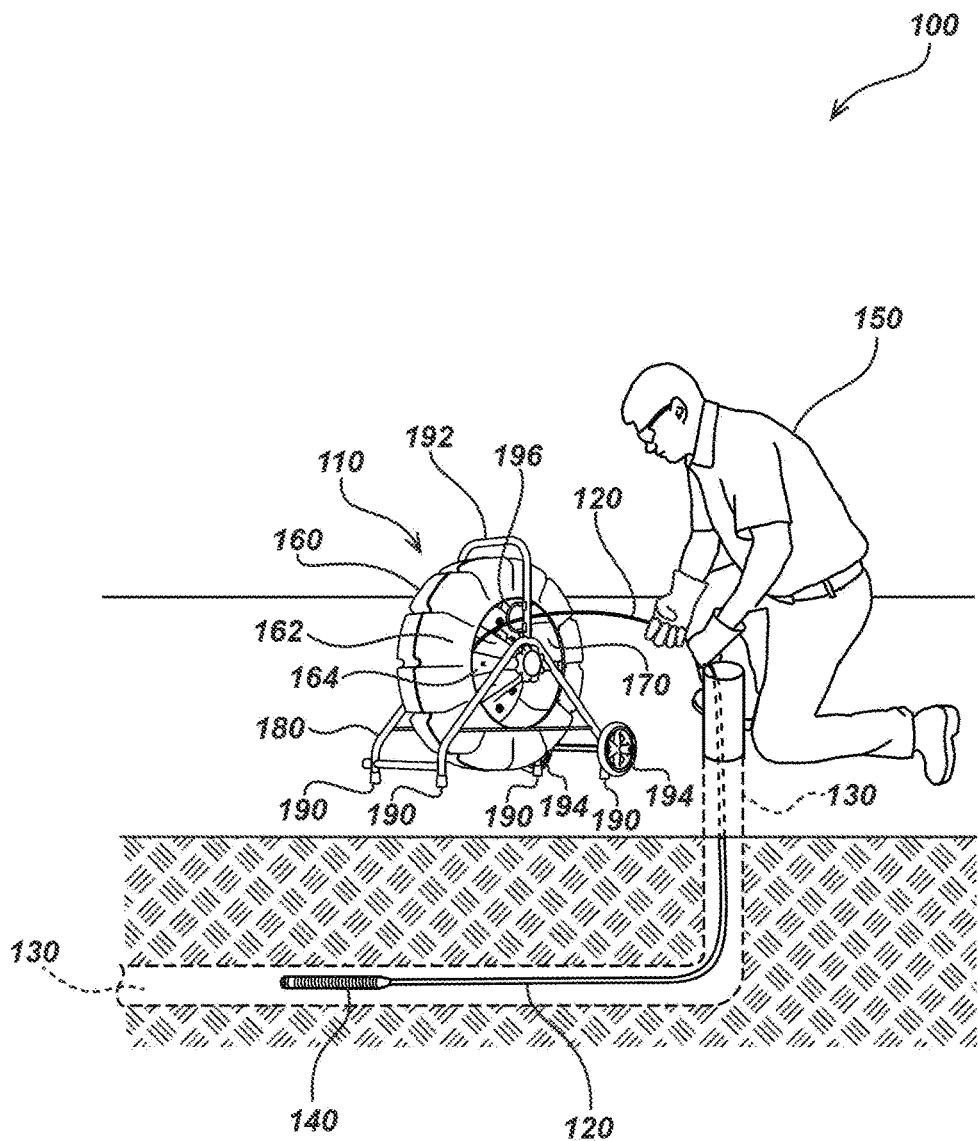
FIG. 1 is an illustration of an embodiment of a typical system for manually feeding one or more cables or hoses from a cable drum-reel with a relatively straight or outward sloped drum face into or out of a pipe or cavity for inspection, as known in the prior art.

It is noted that as used herein, the term "exemplary" means "serving as an example, instance, or illustration." Any aspect, detail, function, implementation, and/or embodiment described herein as "exemplary" is not necessarily to be construed as preferred or advantageous over other aspects and/or embodiments.

Details of example devices, systems, and methods that may be combined with the embodiments disclosed herein, as well as additional components, methods, and configurations that may be used in conjunction with the embodiments described herein, are disclosed in co-assigned patents and patent applications including: U.S. Pat. No. 7,009,399, issued Mar. 7, 2006, entitled OMNIDIRECTIONAL SONDE AND LINE LOCATOR; U.S. Pat. No. 7,136,765, issued Nov. 14, 2006, entitled A BURIED OBJECT LOCATING AND TRACING METHOD AND SYSTEM EMPLOYING PRINCIPAL COMPONENTS ANALYSIS FOR BLIND SIGNAL DETECTION; U.S. Pat. No. 7,221,136, issued May 22, 2007, entitled SONDES FOR LOCATING UNDERGROUND PIPES AND CONDUITS; U.S. Pat. No. 7,276,910, issued Oct. 2, 2007, entitled A COMPACT SELF-TUNED ELECTRICAL RESONATOR FOR BURIED OBJECT LOCATOR APPLICATIONS; U.S. Pat. No. 7,288,929, issued Oct. 30, 2007, entitled INDUCTIVE CLAMP FOR APPLYING SIGNAL TO BURIED UTILITIES; U.S. Pat. No. 7,298,126, issued Nov. 20, 2007, entitled SONDES FOR LOCATING UNDERGROUND PIPES AND CONDUITS; U.S. Pat. No. 7,332,901, issued Feb. 19, 2008, entitled LOCATOR WITH APPARENT DEPTH INDICATION; U.S. Pat. No. 7,443,154, issued Oct. 28, 2008, entitled MULTI-SENSOR MAPPING OMNIDIRECTIONAL SONDE AND LINE LOCATOR; U.S. Pat. No. 7,498,797, issued Mar. 3, 2009, entitled LOCATOR WITH CURRENT-MEASURING CAPABILITY; U.S. Pat. No. 7,498,816, issued Mar. 3, 2009, entitled OMNIDIRECTIONAL SONDE AND LINE LOCATOR; U.S. Pat. No. 7,336,078, issued Feb. 26, 2008, entitled MULTI-SENSOR MAPPING OMNIDIRECTIONAL SONDE AND LINE LOCATORS; U.S. Pat. No. 7,518,374, issued Apr. 14, 2009, entitled RECONFIGURABLE PORTABLE LOCATOR EMPLOYING MULTIPLE SENSOR ARRAYS HAVING FLEXIBLE NESTED ORTHOGONAL ANTENNAS; U.S. Pat. No. 7,557,559, issued Jul. 7, 2009, entitled COMPACT LINE ILLUMINATOR FOR BURIED PIPES AND CABLES; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,733,077, issued Jun. 8, 2010, entitled MULTI-SENSOR MAPPING OMNIDIRECTIONAL SONDE AND LINE LOCATORS AND TRANSMITTER USED THEREWITH; U.S. Pat. No. 7,741,848, issued Jun. 22, 2010, entitled ADAPTIVE MULTICHANNEL LOCATOR SYSTEM FOR MULTIPLE PROXIMITY DETECTION; U.S. Pat. No. 7,755,360, issued Jul. 13, 2010, entitled PORTABLE LOCATOR SYSTEM WITH JAMMING REDUCTION; U.S. Pat. No. 7,825,647, issued Nov. 2, 2010, entitled METHOD FOR LOCATING BURIED PIPES AND CABLES; U.S. Pat. No. 7,830,149, issued Nov. 9, 2010, entitled AN UNDERGROUND UTILITY LOCATOR WITH A TRANSMITTER, A PAIR OF UPWARDLY OPENING POCKET AND HELICAL COIL TYPE ELECTRICAL CORDS; U.S. Pat. No. 7,864,980, issued Jan. 4, 2011, entitled SONDES FOR LOCATING UNDERGROUND PIPES AND CONDUITS; U.S. Pat. No. 7,948,236, issued May 24, 2011, entitled ADAPTIVE MULTI-CHANNEL LOCATOR SYSTEM FOR MULTIPLE PROXIMITY DETECTION; U.S. Pat. No. 7,969,151, issued Jun. 28, 2011, entitled PRE-AMPLIFIER AND MIXER CIRCUITRY FOR A LOCATOR ANTENNA; U.S.

Pat. No. 7,990,151, issued Aug. 2, 2011, entitled TRI-POD BURIED LOCATOR SYSTEM; U.S. Pat. No. 8,013,610, issued Sep. 6, 2011, entitled HIGH Q SELF-TUNING LOCATING TRANSMITTER; U.S. Pat. No. 8,035,390, issued Oct. 11, 2011, entitled OMNIDIRECTIONAL SONDE AND LINE LOCATOR; U.S. Pat. No. 8,106,660, issued Jan. 31, 2012, entitled SONDE ARRAY FOR USE WITH BURIED LINE LOCATOR; U.S. Pat. No. 8,203,343, issued Jun. 19, 2012, entitled RECONFIGURABLE PORTABLE LOCATOR EMPLOYING MULTIPLE SENSOR ARRAYS HAVING FLEXIBLE NESTED ORTHOGONAL ANTENNAS; U.S. Pat. No. 8,264,226, issued Sep. 11, 2012, entitled SYSTEM AND METHOD FOR LOCATING BURIED PIPES AND CABLES WITH A MAN PORTABLE LOCATOR AND A TRANSMITTER IN A MESH NETWORK; U.S. Pat. No. 8,248,056, issued Aug. 21, 2012, entitled A BURIED OBJECT LOCATOR SYSTEM EMPLOYING AUTOMATED VIRTUAL DEPTH EVENT DETECTION AND SIGNALING; U.S. patent application Ser. No. 13/769,202, filed Feb. 15, 2013, entitled SMART PAINT STICK DEVICES AND METHODS; U.S. patent application Ser. No. 13/793,168, filed Mar. 11, 2013, entitled BURIED OBJECT LOCATORS WITH CONDUCTIVE ANTENNA BOBBINS; U.S. Pat. No. 8,400,154, issued Mar. 19, 2013, entitled LOCATOR ANTENNA WITH CONDUCTIVE BOBBIN; U.S. patent application Ser. No. 14/027,027, filed Sep. 13, 2013, entitled SONDE DEVICES INCLUDING A SECTIONAL FERRITE CORE STRUCTURE; U.S. patent application Ser. No. 14/033,349, filed Sep. 20, 2013, entitled AN UNDERGROUND UTILITY LOCATOR WITH A TRANSMITTER, A PAIR OF UPWARDLY OPENING POCKET AND HELICAL COIL TYPE ELECTRICAL CORDS; U.S. Pat. No. 8,547,428, issued Oct. 1, 2013, entitled PIPE MAPPING SYSTEM; U.S. Pat. No. 8,564,295, issued Oct. 22, 2013, entitled METHOD FOR SIMULTANEOUSLY DETERMINING A PLURALITY OF DIFFERENT LOCATIONS OF THE BURIED OBJECTS AND SIMULTANEOUSLY INDICATING THE DIFFERENT LOCATIONS TO A USER, U.S. patent application Ser. No. 14/148,649, filed Jan. 6, 2014, entitled MAPPING LOCATING SYSTEMS & METHODS; U.S. Pat. No. 8,635,043, issued Jan. 21, 2014, entitled LOCATOR AND TRANSMITTER CALIBRATION SYSTEM; U.S. Pat. No. 8,717,028, issued May 6, 2014, entitled SPRING CLIPS FOR USE WITH LOCATING TRANSMITTERS; U.S. Pat. No. 8,773,133, issued Jul. 8, 2014, entitled ADAPTIVE MULTICHANNEL LOCATOR SYSTEM FOR MULTIPLE PROXIMITY DETECTION; U.S. Pat. No. 8,841,912, issued Sep. 23, 2014, entitled PREAMPLIFIER AND MIXER CIRCUITRY FOR A LOCATOR ANTENNA; U.S. Pat. No. 9,041,794, issued May 26, 2015, entitled PIPE MAPPING SYSTEMS AND METHODS; U.S. Pat. No. 9,057,754, issued Jun. 16, 2015, entitled ECONOMICAL MAGNETIC LOCATOR APPARATUS AND METHOD; U.S. Pat. No. 9,081,109, issued Jul. 14, 2015, entitled GROUND-TRACKING DEVICES FOR USE WITH A MAPPING LOCATOR; U.S. Pat. No. 9,082,269, issued Jul. 14, 2015, entitled HAPTIC DIRECTIONAL FEEDBACK HANDLES FOR LOCATION DEVICES; U.S. Pat. No. 9,085,007, issued Jul. 21, 2015, entitled MARKING PAINT APPLICATOR FOR PORTABLE LOCATOR; U.S. Pat. No. 9,207,350, issued Dec. 8, 2015, entitled BURIED OBJECT LOCATOR APPARATUS WITH SAFETY LIGHTING ARRAY; U.S. Pat. No. 9,341,740, issued May 17, 2016, entitled OPTICAL GROUND TRACKING APPARATUS, SYSTEMS, AND METHODS; U.S. Pat. No. 9,372,117, issued Jun. 21, 2016, entitled OPTICAL GROUND TRACKING APPARATUS, SYSTEMS, AND METHODS; U.S. patent application Ser. No. 15/187,785, filed Jun. 21, 2016, entitled BURIED UTILITY LOCATOR GROUND TRACKING APPARATUS, SYSTEMS, AND METHODS; U.S. Pat. No. 9,411,066, issued Aug. 9, 2016, entitled SONDES & METHODS FOR USE WITH BURIED LINE LOCATOR SYSTEMS; U.S. Pat. No. 9,411,067, issued Aug. 9, 2016, entitled GROUND-TRACKING SYSTEMS AND APPARATUS; U.S. Pat. No. 9,435,907, issued Sep. 6, 2016, entitled PHASE SYNCHRONIZED BURIED OBJECT LOCATOR APPARATUS, SYSTEMS, AND METHODS; U.S. Pat. No. 9,465,129, issued Oct. 11, 2016, entitled IMAGE-BASED MAPPING LOCATING SYSTEM; U.S. Pat. No. 9,488,747, issued Nov. 8, 2016, entitled GRADIENT ANTENNA COILS AND ARRAYS FOR USE IN LOCATING SYSTEM; U.S. Pat. No. 9,494,706, issued Nov. 15, 2016, entitled OMNI-INDUCER TRANSMITTING DEVICES AND METHODS; U.S. Pat. No. 9,523,788, issued Dec. 20, 2016, entitled MAGNETIC SENSING BURIED OBJECT LOCATOR INCLUDING A CAMERA; U.S. Pat. No. 9,571,326, issued Feb. 14, 2017, entitled METHOD AND APPARATUS FOR HIGH-SPEED DATA TRANSFER EMPLOYING SELF-SYNCHRONIZING QUADRATURE AMPLITUDE MODULATION (QAM); U.S. Pat. No. 9,599,449, issued Mar. 21, 2017, entitled SYSTEMS AND METHODS FOR LOCATING BURIED OR HIDDEN OBJECTS USING SHEET CURRENT FLOW MODELS; U.S. Pat. No. 9,599,740, issued Mar. 21, 2017, entitled USER INTERFACES FOR UTILITY LOCATORS; U.S. Pat. No. 9,625,602, issued Apr. 18, 2017, entitled SMART PERSONAL COMMUNICATION DEVICES AS USER INTERFACES; U.S. Pat. No. 9,632,202, issued Apr. 25, 2017, entitled ECONOMICAL MAGNETIC LOCATOR APPARATUS AND METHODS; U.S. Pat. No. 9,634,878, issued Apr. 25, 2017, entitled SYSTEMS AND METHODS FOR DATA TRANSFER USING SELF-SYNCHRONIZING QUADRATURE AMPLITUDE MODULATION (QAM); United States Patent Application, filed Apr. 25, 2017, entitled SYSTEMS AND METHODS FOR LOCATING AND/OR MAPPING BURIED UTILITIES USING VEHICLE-MOUNTED LOCATING DEVICES; U.S. Pat. No. 9,638,824, issued May 2, 2017, entitled QUAD-GRADIENT COILS FOR USE IN LOCATING SYSTEMS; United States Patent Application, filed May 9, 2017, entitled BORING INSPECTION SYSTEMS AND METHODS; U.S. Pat. No. 9,651,711, issued May 16, 2017, entitled HORIZONTAL BORING INSPECTION DEVICE AND METHODS; U.S. Pat. No. 9,684,090, issued Jun. 20, 2017, entitled NULLED-SIGNAL LOCATING DEVICES, SYSTEMS, AND METHODS; U.S. Pat. No. 9,696,447, issued Jul. 4, 2017, entitled BURIED OBJECT LOCATING METHODS AND APPARATUS USING MULTIPLE ELECTROMAGNETIC SIGNALS; U.S. Pat. No. 9,696,448, issued Jul. 4, 2017, entitled GROUND-TRACKING DEVICES AND METHODS FOR USE WITH A UTILITY LOCATOR; U.S. Pat. No. 9,703,002, issued Jun. 11, 2017, entitled UTILITY LOCATOR SYSTEMS & METHODS; U.S. patent application Ser. No. 15/670,845, filed Aug. 7, 2016, entitled HIGH FREQUENCY AC-POWERED DRAIN CLEANING AND INSPECTION APPARATUS & METHODS; U.S. patent application Ser. No. 15/681,250, filed Aug. 18, 2017, entitled ELECTRONIC MARKER DEVICES AND SYSTEMS; U.S. patent application Ser. No. 15/681,409, filed Aug. 20, 2017, entitled WIRELESS BURIED PIPE & CABLE LOCATING SYSTEMS; U.S. Pat. No. 9,746,572, issued Aug. 29, 2017, entitled ELEC- TRONIC MARKER DEVICES AND SYSTEMS; U.S. Pat. No. 9,746,573, issued Aug. 29, 2017, entitled WIRELESS BURIED PIPE AND CABLE LOCATING SYSTEMS; U.S. Pat. No. 9,784,837, issued Oct. 10, 2017, entitled OPTICAL GROUND TRACKING APPARATUS, SYSTEMS & METHODS; U.S. patent application Ser. No. 15/811,361, filed Nov. 13, 2017, entitled OPTICAL GROUND-TRACKING APPARATUS, SYSTEMS, AND METHODS; U.S. Pat. No. 9,841,503, issued Dec. 12, 2017, entitled OPTICAL GROUND-TRACKING APPARATUS, SYSTEMS, AND METHODS; U.S. patent application Ser. No. 15/846,102, filed Dec. 18, 2017, entitled SYSTEMS AND METHOD FOR ELECTRONICALLY MARKING, LOCATING AND VIRTUALLY DISPLAYING BURIED UTILITIES; U.S. patent application Ser. No. 15/866,360, filed Jan. 9, 2018, entitled TRACKED DISTANCE MEASURING DEVICES, SYSTEMS, AND METHODS; U.S. Pat. No. 9,891,337, issued Feb. 13, 2018, entitled UTILITY LOCATOR TRANSMITTER DEVICES, SYSTEMS, and METHODS WITH DOCKABLE APPARATUS; U.S. Pat. No. 9,914,157, issued Mar. 13, 2018, entitled METHODS AND APPARATUS FOR CLEARING OBSTRUCTIONS WITH A JETTER PUSH-CABLE APPARATUS; U.S. patent application Ser. No. 15/925,643, issued Mar. 19, 2018, entitled PHASE-SYNCHRONIZED BURIED OBJECT TRANSMITTER AND LOCATOR METHODS AND APPARATUS; U.S. patent application Ser. No. 15/925,671, issued Mar. 19, 2018, entitled MULTI-FREQUENCY LOCATING SYSTEMS AND METHODS; U.S. patent application Ser. No. 15/936,250, filed Mar. 26, 208, entitled GROUND TRACKING APPARATUS, SYSTEMS, AND METHODS; U.S. Pat. No. 9,927,545, issued Mar. 27, 2018, entitled MULTI-FREQUENCY LOCATING SYSTEMS & METHODS; U.S. Pat. No. 9,928,613, issued Mar. 27, 2018, entitled GROUND TRACKING APPARATUS, SYSTEMS, AND METHODS; U.S. patent application Ser. No. 15/250,666, filed Mar. 27, 2018, entitled PHASE-SYNCHRONIZED BURIED OBJECT TRANSMITTER AND LOCATOR METHODS AND APPARATUS; U.S. Pat. No. 9,880,309, issued Mar. 28, 2018, entitled UTILITY LOCATOR TRANSMITTER APPARATUS & METHODS; U.S. patent application Ser. No. 15/954,486, filed Apr. 16, 2018, entitled UTILITY LOCATOR APPARATUS, SYSTEMS, AND METHODS; U.S. Pat. No. 9,945,976, issued Apr. 17, 2018, entitled UTILITY LOCATOR APPARATUS, SYSTEMS, AND METHODS; U.S. Pat. No. 9,989,662, issued Jun. 5, 2018, entitled BURIED OBJECT LOCATING DEVICE WITH A PLURALITY OF SPHERICAL SENSOR BALLS THAT INCLUDE A PLURALITY OF ORTHOGONAL ANTENNAE; U.S. patent application Ser. No. 16/036,713, issued Jul. 16, 2018, entitled UTILITY LOCATOR APPARATUS AND SYSTEMS; U.S. Pat. No. 10,024,994, issued Jul. 17, 2018, entitled WEARABLE MAGNETIC FIELD UTILITY LOCATOR SYSTEM WITH SOUND FIELD GENERATION; U.S. Pat. No. 10,031,253, issued Jul. 24, 2018, entitled GRADIENT ANTENNA COILS AND ARRAYS FOR USE IN LOCATING SYSTEMS; U.S. Pat. No. 10,042,072, issued Aug. 7, 2018, entitled OMNI-INDUCER TRANSMITTING DEVICES AND METHODS; U.S. Pat. No. 10,059,504, issued Aug. 28, 2018, entitled MARKING PAINT APPLICATOR FOR USE WITH PORTABLE UTILITY LOCATOR; U.S. patent application Ser. No. 16/049,699, filed Jul. 30, 2018, entitled OMNI-INDUCER TRANSMITTING DEVICES AND METHODS; U.S. Pat. No. 10,069,667, issued Sep. 4, 2018, entitled SYSTEMS AND METHODS FOR DATA TRANSFER USING SELF-SYNCHRONIZING QUADRATURE AMPLITUDE MODULATION (QAM); U.S. patent application Ser. No. 16/121,379, filed Sep. 4, 2018, entitled KEYED CURRENT SIGNAL UTILITY LOCATING SYSTEMS AND METHODS; U.S. patent application Ser. No. 16/125,768, filed Sep. 10, 2018, entitled BURIED OBJECT LOCATOR APPARATUS AND METHODS; U.S. Pat. No. 10,073,186, issued Sep. 11, 2018, entitled KEYED CURRENT SIGNAL UTILITY LOCATING SYSTEMS AND METHODS; U.S. patent application Ser. No. 16/133,642, issued Sep. 17, 2018, entitled MAGNETIC UTILITY LOCATOR DEVICES AND METHODS; U.S. Pat. No. 10,078,149, issued Sep. 18, 2018, entitled BURIED OBJECT LOCATORS WITH DODECAHEDRAL ANTENNA NODES; U.S. Pat. No. 10,082,591, issued Sep. 25, 2018, entitled MAGNETIC UTILITY LOCATOR DEVICES & METHODS; U.S. Pat. No. 10,082,599, issued Sep. 25, 2018, entitled MAGNETIC SENSING BURIED OBJECT LOCATOR INCLUDING A CAMERA; U.S. Pat. No. 10,090,498, issued Oct. 2, 2018, entitled MODULAR BATTERY PACK APPARATUS, SYSTEMS, AND METHODS INCLUDING VIRAL DATA AND/OR CODE TRANSFER; U.S. patent application Ser. No. 16/160,874, filed Oct. 15, 2018, entitled TRACKABLE DIPOLE DEVICES, METHODS, AND SYSTEMS FOR USE WITH MARKING PAINT STICKS; U.S. patent application Ser. No. 16/222,994, filed Dec. 17, 2018, entitled UTILITY LOCATORS WITH RETRACTABLE SUPPORT STRUCTURES AND APPLICATIONS THEREOF; U.S. Pat. No. 10,105,723, issued Oct. 23, 2018, entitled TRACKABLE DIPOLE DEVICES, METHODS, AND SYSTEMS FOR USE WITH MARKING PAINT STICKS; U.S. Pat. No. 10,162,074, issued Dec. 25, 2018, entitled UTILITY LOCATORS WITH RETRACTABLE SUPPORT STRUCTURES AND APPLICATIONS THEREOF; U.S. patent application Ser. No. 16/241,864, filed Jan. 7, 2019, entitled TRACKED DISTANCE MEASURING DEVICES, SYSTEMS, AND METHODS; U.S. patent application Ser. No. 16/255,524, filed Jan. 23, 2019, entitled RECHARGEABLE BATTERY PACK ONBOARD CHARGE STATE INDICATION METHODS AND APPARATUS; U.S. Pat. No. 10,247,845, issued Apr. 2, 2019, entitled UTILITY LOCATOR TRANSMITTER APPARATUS AND METHODS; U.S. patent application Ser. No. 16/382,136, filed Apr. 11, 2019, entitled GEOGRAPHIC MAP UPDATING METHODS AND SYSTEMS; U.S. Pat. No. 10,274,632, issued Apr. 20, 2019, entitled UTILITY LOCATING SYSTEMS WITH MOBILE BASE STATION; U.S. patent application Ser. No. 16/390,967, filed Apr. 22, 2019, entitled UTILITY LOCATING SYSTEMS WITH MOBILE BASE STATION; U.S. patent application Ser. No. 29/692,937, filed May 29, 2019, entitled BURIED OBJECT LOCATOR; U.S. patent application Ser. No. 16/436,903, filed Jun. 10, 2019, entitled OPTICAL GROUND TRACKING APPARATUS, SYSTEMS, AND METHODS FOR USE WITH BURIED UTILITY LOCATORS; U.S. Pat. No. 10,317,559, issued Jun. 11, 2019, entitled GROUND-TRACKING DEVICES AND METHODS FOR USE WITH A UTILITY LOCATOR; U.S. patent application Ser. No. 16/449,187, filed Jun. 21, 2019, entitled ELECTROMAGNETIC MARKER DEVICES FOR BURIED OR HIDDEN USE; U.S. patent application Ser. No. 16/455,491, filed Jun. 27, 2019, entitled SELF-STANDING MULTI-LEG ATTACHMENT DEVICES FOR USE WITH UTILITY LOCATORS; U.S. Pat. No. 10,353,103, issued Jul. 16, 2019, entitled SELF-STANDING MULTI-LEG ATTACHMENT DEVICES FOR USE WITH UTILITY LOCATORS; U.S. patent application Ser. No. 16/551,653, filed Aug. 26, 2019, entitled BURIED UTILITY MARKER DEVICES, SYSTEMS, AND METHODS; U.S. Pat. No. 10,401,526, issued Sep. 3, 2019, entitled BURIED UTILITY MARKER DEVICES, SYSTEMS, AND METHODS; U.S. Pat. No. 10,324,188, issued Oct. 9, 2019, entitled OPTICAL GROUND TRACKING APPARATUS, SYSTEMS, AND METHODS FOR USE WITH BURIED UTILITY LOCATORS; U.S. patent application Ser. No. 16/446,456, filed Jun. 19, 2019, entitled DOCKABLE TRIPODAL CAMERA CONTROL UNIT; U.S. patent application Ser. No. 16/520,248, filed Jul. 23, 2019, entitled MODULAR BATTERY PACK APPARATUS, SYSTEMS, AND METHODS; U.S. Pat. No. 10,371,305, issued Aug. 6, 2019, entitled DOCKABLE TRIPODAL CAMERA CONTROL UNIT; U.S. Pat. No. 10,490,908, issued Nov. 26, 2019, entitled DUAL ANTENNA SYSTEMS WITH VARIABLE POLARIZATION; U.S. patent application Ser. No. 16/701,085, filed Dec. 2, 2019, entitled MAP GENERATION BASED ON UTILITY LINE POSITION AND ORIENTATION ESTIMATES; U.S. Pat. No. 10,534,105, issued Jan. 14, 2020, entitled UTILITY LOCATING TRANSMITTER APPARATUS AND METHODS; U.S. patent application Ser. No. 16/773,952, filed Jan. 27, 2020, entitled MAGNETIC FIELD CANCELING AUDIO DEVICES; U.S. patent application Ser. No. 16/780,813, filed Feb. 3, 2020, entitled RESILIENTLY DEFORMABLE MAGNETIC FIELD CORE APPARATUS AND APPLICATIONS; U.S. Pat. No. 10,555,086, issued Feb. 4, 2020, entitled MAGNETIC FIELD CANCELING AUDIO SPEAKERS FOR USE WITH BURIED UTILITY LOCATORS OR OTHER DEVICES; U.S. patent application Ser. No. 16/786,935, filed Feb. 10, 2020, entitled SYSTEMS AND METHODS FOR UNIQUELY IDENTIFYING BURIED UTILITIES IN A MULTI-UTILITY ENVIRONMENT; U.S. Pat. No. 10,557,824, issued Feb. 11, 2020, entitled RESILIENTLY DEFORMABLE MAGNETIC FIELD TRANSMITTER CORES FOR USE WITH UTILITY LOCATING DEVICES AND SYSTEMS; U.S. patent application Ser. No. 16/791,979, issued Feb. 14, 2020, entitled MARKING PAINT APPLICATOR APPARATUS; U.S. patent application Ser. No. 16/792,047, filed Feb. 14, 2020, entitled SATELLITE AND MAGNETIC FIELD SONDE APPARATUS AND METHODS; U.S. Pat. No. 10,564,309, issued Feb. 18, 2020, entitled SYSTEMS AND METHODS FOR UNIQUELY IDENTIFYING BURIED UTILITIES IN A MULTI-UTILITY ENVIRONMENT; U.S. Pat. No. 10,571,594, issued Feb. 25, 2020, entitled UTILITY LOCATOR DEVICES, SYSTEMS, AND METHODS WITH SATELLITE AND MAGNETIC FIELD SONDE ANTENNA SYSTEMS; U.S. Pat. No. 10,569,952, issued Feb. 25, 2020, entitled MARKING PAINT APPLICATOR FOR USE WITH PORTABLE UTILITY LOCATOR; U.S. patent application Ser. No. 16/810,788, filed Mar. 5, 2019, entitled MAGNETICALLY RETAINED DEVICE HANDLES; U.S. patent application Ser. No. 16/827,672, filed Mar. 23, 2020, entitled DUAL ANTENNA SYSTEMS WITH VARIABLE POLARIZATION; U.S. patent application Ser. No. 16/833,426, filed Mar. 27, 2020, entitled LOW COST, HIGH PERFORMANCE SIGNAL PROCESSING IN A MAGNETIC-FIELD SENSING BURIED UTILITY LOCATOR SYSTEM; U.S. Pat. No. 10,608,348, issued Mar. 31, 2020, entitled DUAL ANTENNA SYSTEMS WITH VARIABLE POLARIZATION; U.S. patent application Ser. No. 16/837,923, filed Apr. 1, 2020, entitled MODULAR BATTERY PACK APPARATUS, SYSTEMS, AND METHODS INCLUDING VIRAL DATA AND/OR CODE TRANSFER; U.S. patent application Ser. No. 17/235,507, filed Apr. 20, 2021, entitled UTILITY LOCATING DEVICES EMPLOYING MULTIPLE SPACED APART GNSS ANTENNAS; U.S. Provisional Patent Application 63/015,692, filed Apr. 27, 2020, entitled SPATIALLY AND PROCESSING-BASED DIVERSE REDUNDANCY FOR RTK POSITIONING; U.S. patent application Ser. No. 16/872,362, filed May 11, 2020, entitled BURIED LOCATOR SYSTEMS AND METHODS; U.S. patent application Ser. No. 16/882,719, filed May 25, 2020, entitled UTILITY LOCATING SYSTEMS, DEVICES, AND METHODS USING RADIO BROADCAST SIGNALS; U.S. Pat. No. 10,670,766, issued Jun. 2, 2020, entitled UTILITY LOCATING SYSTEMS, DEVICES, AND METHODS USING RADIO BROADCAST SIGNALS; U.S. Pat. No. 10,677,820, issued Jun. 9, 2020, entitled BURIED LOCATOR SYSTEMS AND METHODS; U.S. patent application Ser. No. 16/902,245, filed Jun. 15, 2020, entitled LOCATING DEVICES, SYSTEMS, AND METHODS USING FREQUENCY SUITES FOR UTILITY DETECTION; U.S. patent application Ser. No. 16/902,249, filed Jun. 15, 2020, entitled USER INTERFACES FOR UTILITY LOCATORS: U.S. Pat. No. 10,690,795, issued Jun. 23, 2020, entitled LOCATING DEVICES, SYSTEMS, AND METHODS USING FREQUENCY SUITES FOR UTILITY DETECTION; U.S. patent application Ser. No. 16/908,625, filed Jun. 22, 2020, entitled ELECTROMAGNETIC MARKER DEVICES WITH SEPARATE RECEIVE AND TRANSMIT ANTENNA ELEMENTS; U.S. Pat. No. 10,690,796, issued Jun. 23, 2020, entitled USER INTERFACES FOR UTILITY LOCATORS; U.S. patent application Ser. No. 16/921,775, filed Jul. 6, 2020, entitled AUTO-TUNING CIRCUIT APPARATUS AND METHODS; U.S. Provisional Patent Application 63/055,278, filed Jul. 22, 2020, entitled VEHICLE-BASED UTILITY LOCATING USING PRINCIPAL COMPONENTS; U.S. patent application Ser. No. 16/995,801, filed Aug. 17, 2020, entitled UTILITY LOCATOR TRANSMITTER DEVICES, SYSTEMS, AND METHODS; U.S. patent application Ser. No. 17/001,200, filed Aug. 24, 2020, entitled MAGNETIC SENSING BURIED UTILITY LOCATOR INCLUDING A CAMERA; U.S. patent Ser. No. 16/995,793, filed Aug. 17, 2020, entitled UTILITY LOCATOR APPARATUS AND METHODS; U.S. Pat. No. 10,753,722, issued Aug. 25, 2020, entitled SYSTEMS AND METHODS FOR LOCATING BURIED OR HIDDEN OBJECTS USING SHEET CURRENT FLOW MODELS; U.S. Pat. No. 10,754,053, issued Aug. 25, 2020, entitled UTILITY LOCATOR TRANSMITTER DEVICES, SYSTEMS, AND METHODS WITH DOCKABLE APPARATUS; U.S. Pat. No. 10,761,233, issued Sep. 1, 2020, entitled SONDES AND METHODS FOR USE WITH BURIED LINE LOCATOR SYSTEMS; U.S. Pat. No. 10,761,239, issued Sep. 1, 2020, entitled MAGNETIC SENSING BURIED UTILITY LOCATOR INCLUDING A CAMERA; U.S. patent application Ser. No. 17/013,831, filed Sep. 7, 2020, entitled MULTIFUNCTION BURIED UTILITY LOCATING CLIPS; U.S. Pat. No. 10,777,919, issued Sep. 15, 2020, entitled MULTIFUNCTION BURIED UTILITY LOCATING CLIPS; U.S. patent application Ser. No. 17/020,487, filed Sep. 14, 2020, entitled ANTENNA SYSTEMS FOR CIRCULARLY POLARIZED RADIO SIGNALS; U.S. patent application Ser. No. 17/068,156, filed Oct. 12, 2020, entitled DUAL SENSED LOCATING SYSTEMS AND METHODS; U.S. Provisional Patent Application 63/091,67, filed Oct. 14, 2020, entitled ELECTRONIC MARKER-BASED NAVIGATION SYSTEMS AND METHODS FOR USE IN GNSS-DEPRIVED ENVIRONMENTS; U.S. Pat. No. 10,809,408, issued Oct. 20, 2020, entitled DUAL SENSED LOCATING SYSTEMS AND METHODS; U.S.

Pat. No. 10,845,497, issued Nov. 24, 2020, entitled PHASE-SYNCHRONIZED BURIED OBJECT TRANSMITTER AND LOCATOR METHODS AND APPARATUS; U.S. Pat. No. 10,859,727, issued Dec. 8, 2020, entitled ELECTRONIC MARKER DEVICES AND SYSTEMS; U.S. Pat. No. 10,908,311, issued Feb. 2, 2021, entitled SELF-STANDING MULTI-LEG ATTACHMENT DEVICES FOR USE WITH UTILITY LOCATORS; U.S. Pat. No. 10,928,538, issued Feb. 23, 2021, entitled KEYED CURRENT SIGNAL LOCATING SYSTEMS AND METHODS; U.S. Pat. No. 10,935,686, issued Mar. 2, 2021, entitled UTILITY LOCATING SYSTEM WITH MOBILE BASE STATION; and U.S. Pat. No. 10,955,583, issued Mar. 23, 2021, entitled BORING INSPECTION SYSTEMS AND METHODS; U.S. Pat. No. 10,983,239, issued Apr. 20, 2021, entitled MULTI-FREQUENCY LOCATING SYSTEMS AND METHODS; U.S. Pat. No. 10,983,240, issued Apr. 20, 2021, entitled MAGNETIC UTILITY LOCATOR DEVICE AND METHOD; U.S. Pat. No. 10,989,830, issued Apr. 27, 2021, entitled UTILITY LOCATOR APPARATUS AND SYSTEMS; U.S. Pat. No. 11,014,734, issued May 25, 2021, entitled MARKING PAINT APPLICATOR APPARATUS; U.S. Pat. No. 11,029,439, issued Jun. 8, 2021, entitled UTILITY LOCATOR APPARATUS, SYSTEMS, AND METHODS; U.S. Provisional Patent Application 63/212,713, filed Jun. 20, 2021, entitled DAYLIGHT VISIBLE AND MULTI-SPECTRAL LASER RANGEFINDERS AND ASSOCIATED METHODS AND UTILITY LOCATOR DEVICES; U.S. Pat. No. D922,885, issued Jun. 22, 2021, entitled BURIED UTILITY LOCATOR; U.S. patent application Ser. No. 17/379,867, filed Jul. 19, 2021, entitled LOCATING DEVICES, SYSTEMS, AND METHODS USING FREQUENCY SUITES FOR UTILITY DETECTION; U.S. patent application Ser. No. 17/382,040, filed Jul. 21, 2021, entitled VEHICLE-BASED UTILITY LOCATING USING PRINCIPAL COMPONENTS; U.S. Pat. No. 11,073,632, issued Jul. 27, 2021, entitled LOCATING DEVICES, SYSTEMS, AND METHODS USING FREQUENCY SUITES FOR UTILITY DETECTION; U.S. Pat. No. 11,092,712, issued Aug. 17, 2021, entitled UTILITY LOCATING SYSTEMS, DEVICES, AND METHODS USING RADIO BROADCAST SIGNALS; U.S. patent application Ser. No. 17/461,833, filed Aug. 30, 2021, entitled COMBINED SATELLITE NAVIGATION AND RADIO TRANSCEIVER ANTENNA DEVICES; U.S. patent application Ser. No. 17/467,435, filed Sep. 6, 2021, entitled TRACKABLE DIPOLE DEVICES, METHODS, AND SYSTEMS FOR USE WITH MARKING PAINT STICKS; U.S. patent application Ser. No. 17/467,438, filed Sep. 6, 2021, entitled SATELLITE AND MAGNETIC FIELD SONDE APPARATUS AND METHODS; U.S. Pat. No. 11,137,513, issued Oct. 5, 2021, entitled INDUCTIVE CLAMP DEVICES, SYSTEMS, AND METHODS; U.S. Pat. No. 11,146,892, issued Oct. 12, 2021, entitled MAGNETIC FIELD CANCELING AUDIO DEVICES; U.S. patent application Ser. No. 17/501,670, filed Oct. 14, 2021, entitled ELECTRONIC MARKER-BASED NAVIGATION SYSTEMS AND METHODS FOR USE IN GNSS-DEPRIVED ENVIRONMENTS; U.S. Pat. No. 11,156,737, issued Oct. 26, 2021, entitled BURIED OBJECT LOCATOR APPARATUS AND METHODS; U.S. Pat. No. 11,171,369, issued Nov. 9, 2021, entitled MODULAR BATTERY PACK APPARATUS, SYSTEMS, AND METHODS; U.S. patent application Ser. No. 17/522,857, filed Nov. 9, 2021, entitled WIRELESS BURIED PIPE AND CABLE LOCATING SYSTEMS; U.S. patent application Ser. No. 17/523,857, filed Nov. 10, 2021, entitled SONDE DEVICES INCLUDING A SECTIONAL FERRITE CORE STRUCTURE; U.S. Pat. No. 11,175,427, issued Nov. 16, 2021, entitled BURIED UTILITY LOCATING SYSTEMS WITH OPTIMIZED WIRELESS DATA COMMUNICATION; U.S. patent application Ser. No. 17/531,533, filed Nov. 19, 2021, entitled INPUT MULTIPLEXED SIGNAL PROCESSING APPARATUS AND METHODS; U.S. patent application Ser. No. 17/540,239, filed Dec. 1, 2021, entitled DUAL SENSED LOCATING SYSTEMS AND METHODS; U.S. patent application Ser. No. 17/541,057, filed Dec. 2, 2021, entitled COLOR-INDEPENDENT MARKER DEVICE APPARATUS, SYSTEMS, AND METHODS; U.S. patent application Ser. No. 17/540,231, filed Dec. 2, 2021, entitled AUTO-TUNING CIRCUIT APPARATUS AND METHODS; U.S. Pat. No. 11,193,767, issued Dec. 7, 2021, entitled SMART PAINT STICK DEVICES AND METHODS; U.S. Pat. No. 11,199,521, issued Dec. 14, 2021, entitled RESILIENTLY DEFORMABLE MAGNETIC FIELD CORE APPARATUS AND APPLICATIONS; U.S. Pat. No. 11,204,246, issued Dec. 21, 2021, entitled DUAL SENSED LOCATING SYSTEMS AND METHODS; U.S. Provisional Patent Application 63/293,828, filed Dec. 26, 2021, entitled MODULAR BATTERY SYSTEMS INCLUDING BATTERY INTERFACE APPARATUS; U.S. patent application Ser. No. 17/563,049, filed Dec. 28, 2021, entitled SONDE DEVICES WITH A SECTIONAL FERRITE CORE; U.S. Provisional Patent Application 63/306,088, filed Feb. 2, 2022, entitled UTILITY LOCATING SYSTEMS AND METHODS WITH FILTER TUNING FOR POWER GRID FLUCTUATIONS; U.S. patent application Ser. No. 17/687,538, filed Mar. 4, 2022, entitled ANTENNAS, MULTI-ANTENNA APPARATUS, AND ANTENNA HOUSINGS; U.S. patent application Ser. No. 17/694,640, filed Mar. 14, 2022, entitled UTILITY LOCATORS WITH RETRACTABLE SUPPORT STRUCTURES AND APPLICATIONS THEREOF; U.S. patent application Ser. No. 17/694,656, filed Mar. 14, 2022, entitled ELECTROMAGNETIC MARKER DEVICES FOR BURIED OR HIDDEN USE; U.S. Pat. No. 11,280,934, issued Mar. 22, 2022, entitled ELECTROMAGNETIC MARKER DEVICES FOR BURIED OR HIDDEN USE; U.S. Pat. No. 11,300,597, issued Apr. 12, 2022, entitled SYSTEMS AND METHODS FOR LOCATING AND/OR MAPPING BURIED UTILITIES USING VEHICLE-MOUNTED LOCATING DEVICES; U.S. Pat. No. 11,300,700, issued Apr. 12, 2022, entitled SYSTEMS AND METHODS OF USING A SONDE DEVICE WITH A SECTIONAL FERRITE CORE STRUCTURE; U.S. Pat. No. 11,300,701, issued Apr. 12, 2022, entitled UTILITY LOCATORS WITH RETRACTABLE SUPPORT STRUCTURES; U.S. patent application Ser. No. 17/728,949, filed Apr. 25, 2022, entitled BURIED UTILITY LOCATOR GROUND TRACKING APPARATUS, SYSTEMS, AND METHODS; U.S. patent application Ser. No. 17/731,579, filed Apr. 28, 2022, entitled BURIED UTILITY MARKER DEVICES, SYSTEMS, AND METHODS; and U.S. Pat. No. 11,333,786, issued May 17, 2022, entitled BURIED UTILITY MARKER DEVICES, SYSTEMS, AND METHODS. The content of each of the above-described patents and applications is incorporated by reference herein in its entirety. The above applications may be collectively denoted herein as the "co-assigned applications" or "incorporated applications."

EXAMPLE EMBODIMENTS

FIG. 1 illustrates details of an exemplary embodiment of a system 100 for pipe or cavity inspection, as known in the prior art. System 100 may include a cable drum-reel 110 used for storing, deploying, and/or retracting one or more cables and/or hoses 120 for inspecting a pipe or cavity 130. The one or more cables and/or hoses 120 may include a push-cable 120 with a distally mounted camera 140 for allowing a user 150 to inspect a pipe or cavity 130. Cable drum-reel 110 typically includes an enclosure 160 to removably receive and rotatably support the drum-reel 110, and a centrally mounted projecting hub 164 for storing an encircled cable or hose 120. In some embodiments, hub 164 may be integral to enclosure 160, or it may be removably attachable. Enclosure 160 typically includes a front drum face 162 which is relatively straight or sloped outwardly away from the enclosure 160, as known in the prior art. An opening 170 is provided for allowing push-cable 120 to enter and exit cable drum-reel 110 during deployment or retraction. Cable drum-reel 110 may include a frame 180, stabilizing feet 190, and a handle 192, and/or wheels 194 for allowing a user 150 to easily and conveniently relocate the cable drum-reel 110 as needed. One or more cable guides 196 may be provided for additional guidance of the push cable 120 into and out of cable drum-reel 110. The cable guides 196 may be attached in various locations on the frame 180, or on the enclosure 160. They may be permanently mounted or removably attachable.

Figure 2:
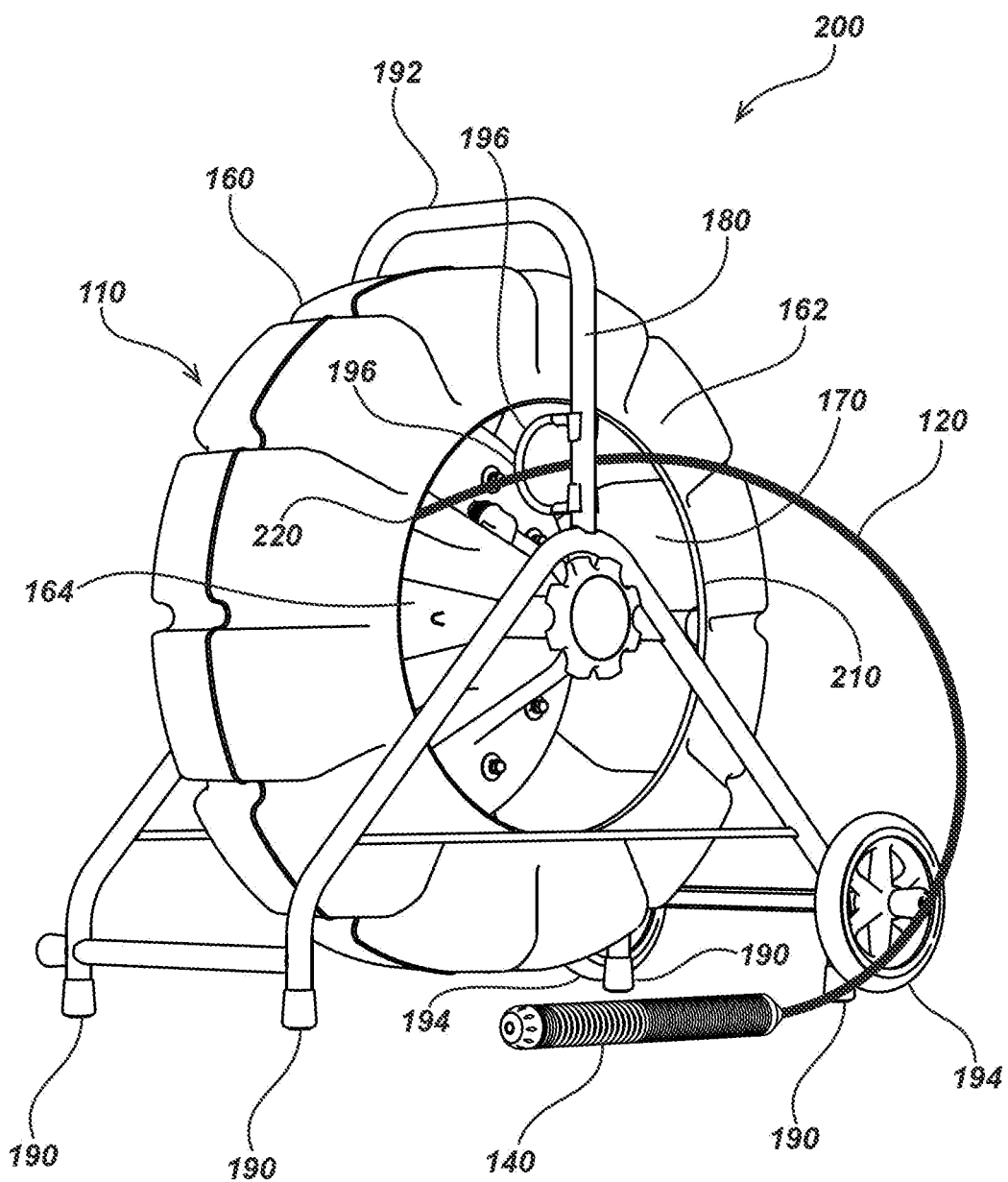
FIG. 2 is an illustration of an embodiment of a cable drum-reel with a relatively straight or outward sloped drum face, as known in the prior art.

FIG. 2 illustrates details of an exemplary embodiment 200 of a cable drum-reel 110, as known in the prior art. An enclosure 160 with an opening 170 on the front drum face 162 may be provided. Front drum face 162 may include an outer surface edge or lip 210 which may be relatively flat or protrude outward away from the enclosure 160. The front drum face 162 is shown relatively straight or sloped outward away from the enclosure 160, as known in the prior art. A cable entry/exit point 220 is shown at one possible location on the front drum face 162, at the point where the cable enters or exits the enclosure 160. With a typical relatively straight or sloped outward front drum face 162, the push-cable 120 will often come in contact with drum lip 210 at the cable entry-exit point 220 causing rubbing and friction which over time causes wear and tear on push-cable 120 and enclosure 160.

Figure 3A:
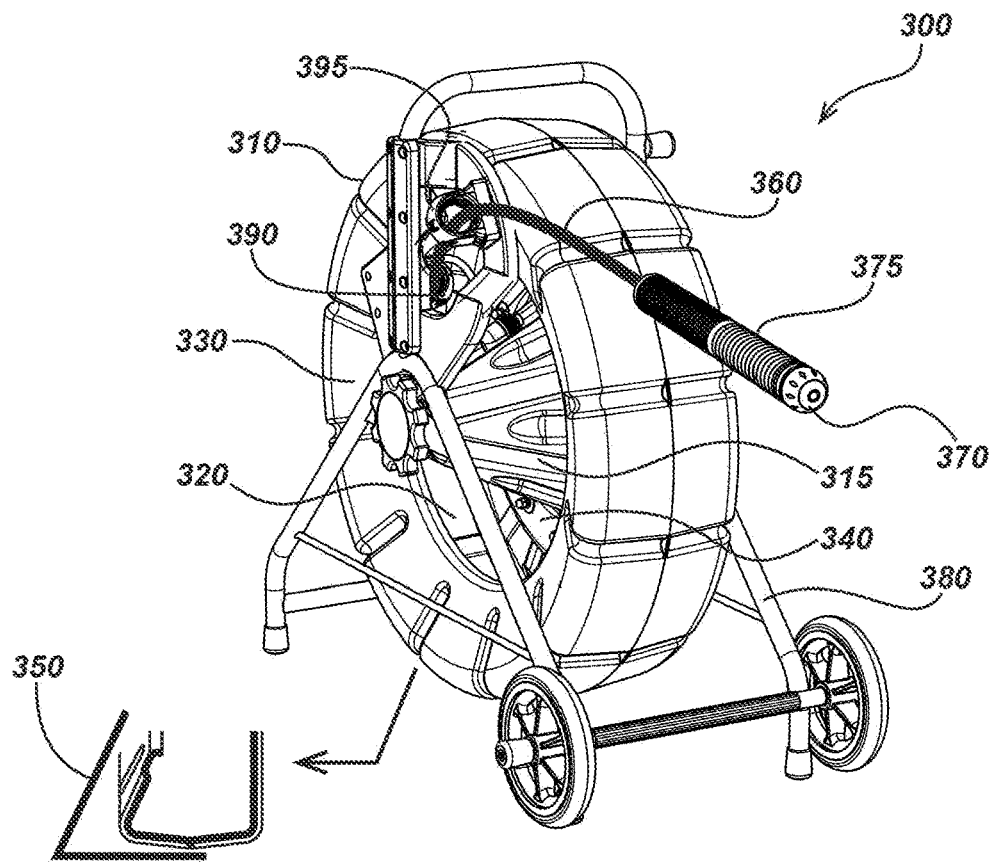
FIG. 3A is an illustration of an embodiment of a cable drum-reel with an inward sloped drum face and two cable guide points, in accordance with certain aspects of the present invention.

FIG. 3A illustrates details of an exemplary embodiment 300 of a cable drum-reel with an inward sloped drum face. An enclosure 310 with an opening 320 on the front drum face 330 for allowing a cable or push-cable 360 to enter or exit the enclosure 310, may be provided. The drum face 330 is sloped inward towards the inside of the drum enclosure 310 at a specified slope angle 350. A camera 370 for pipe or cavity inspection may be attached to the distal end of the push-cable 360. A frame 380 may be provided for holding the cable drum-reel 300 in an upright position. The frame 380 can also be positioned to allow the cable drum-reel 300 to be put in a number of different positions, for instance on its side, as needed.

One or more cable guides 390 and 395 may be provided for directional guidance of the push-cable 360 into the drum enclosure 310 and onto a centrally mounted axially projecting hub (not shown) inside the drum enclosure 310.

Slope angle 350 is measured relative to an axis about which the cable drum-reel 300 rotates, or centerline of the hub. In one embodiment, slope angle 350 is chosen to optimize and/or maximize the bend radius of push-cable 360 based on the specific drum size and dimensions of cable drum-reel 300.

In one embodiment, cable guide 390 is an inner cable guide positioned near the inside edge of the drum opening 320, and cable guide 395 is an outer cable guide positioned near the outside perimeter of the front face of the cable drum-reel enclosure 310. Cable guides 390 and 395, in combination with inward sloped drum face 330 are used to direct or steer push-cable 360 towards a desired location in enclosure 310 in order to control the bend radius of the push-cable 360. A larger bend radius applied to push-cable 360 will reduce the forces placed on the push-cable 360.

In one embodiment, the front face inward sloped drum face 330 could be part of hub 315 which does not move, i.e. does not spin/rotate. In one embodiment, opening 320 could be large in size compared to drum face 330 in order to allow enclosure 310 to rotate around drum face 330 which is stationary in this embodiment. Drum face 330 may comprise a low friction surface material to prevent or reduce friction with push-cable 360.

Figure 3B:
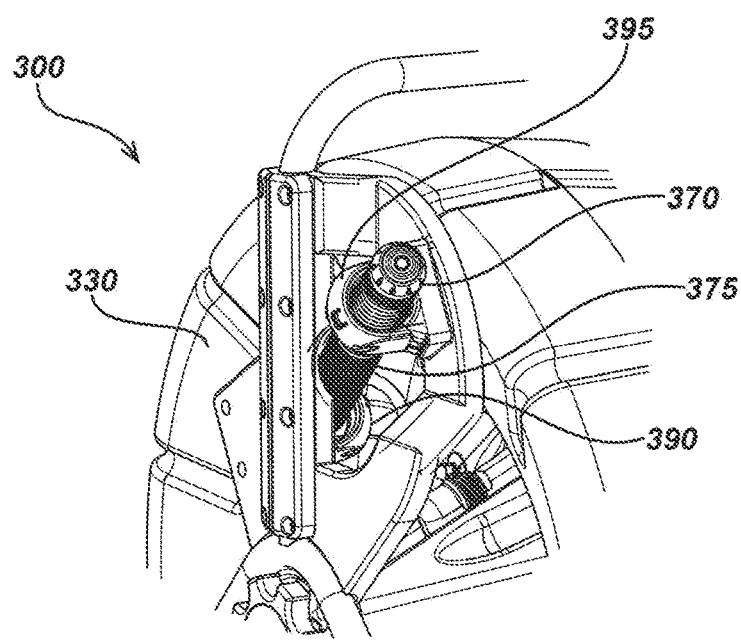
FIG. 3B is an illustration of details of an embodiment of a cable drum-reel with an inward sloped drum face and two cable guide points with one of the guide points used to store an inspection camera.

FIG. 3B illustrates details of an exemplary embodiment 300 of a cable drum-reel with an inward sloped drum face 330 with inner cable guide 390 and outer cable guide 395. In this embodiment, camera 370 is being stored in outer cable guide 395. Cable guide 395 may have a locking latch or other mechanism (not shown) to secure camera 370 at least partially within cable guide 395 for storage until needed.

Figure 4:
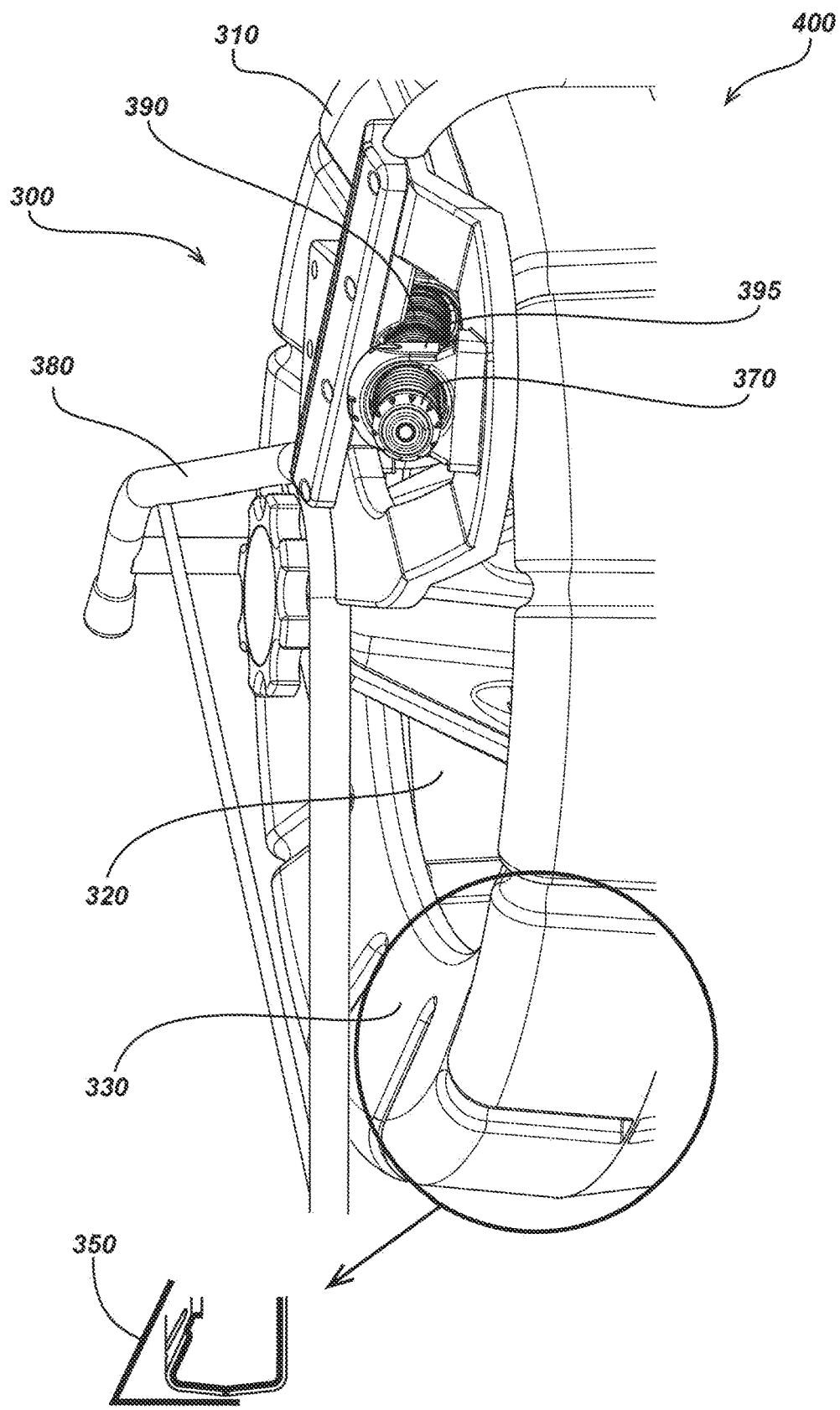
FIG. 4 is a side view illustration of details of an embodiment of a cable drum-reel with an inward sloped drum face and two cable guides, in accordance with certain aspects of the present invention.

FIG. 4 illustrates a partial side view of an exemplary embodiment 400 of a cable drum-reel 400 with an inward sloped drum face 330. In this embodiment, camera 370 is shown securely stored in outer cable guide 395. Camera 370 may be connected to push-cable 360 via a flexible camera coil 375 (FIGS. 3A and 3B) which allows it to move more efficiently and safely through pipes or cavities which often have sharp curves or turns, as well as obstructions.

Figure 5:
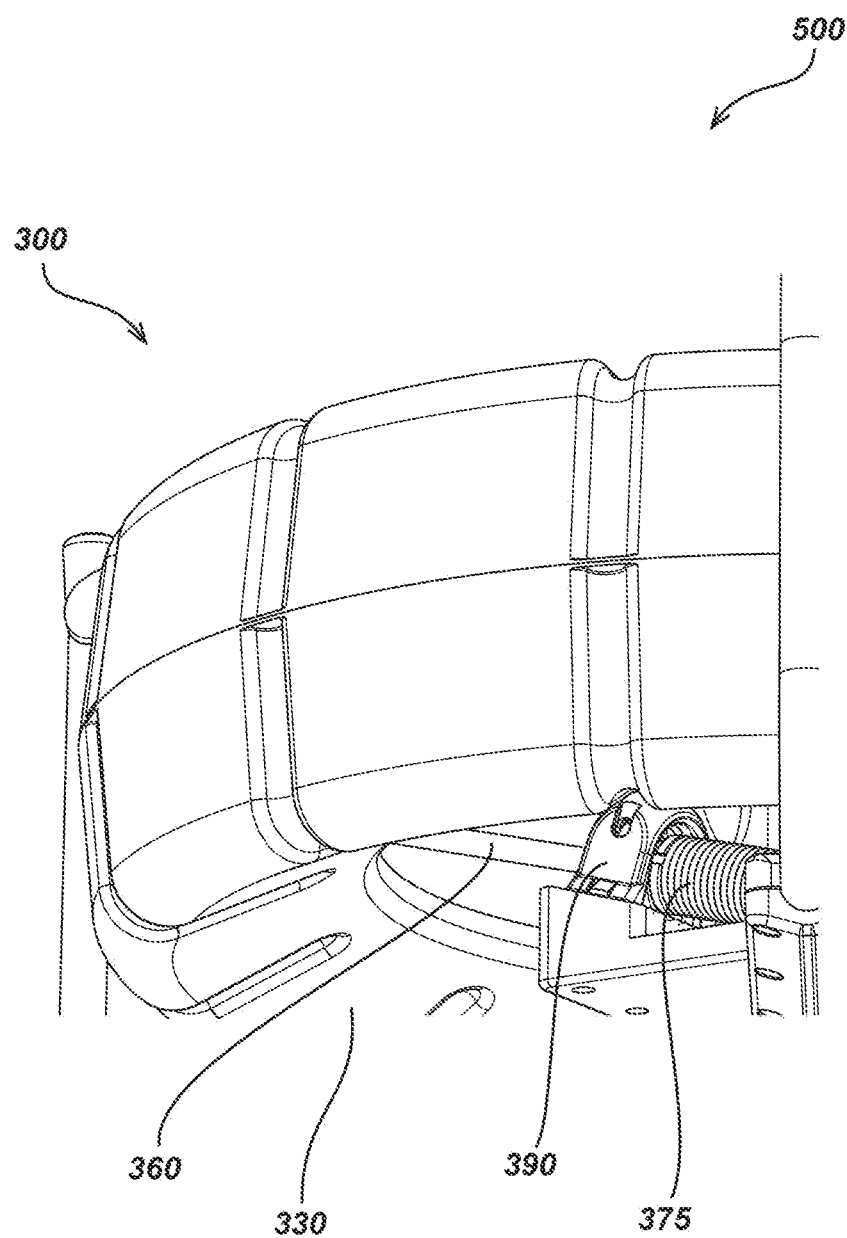
FIG. 5 is an illustration of details of an embodiment of a cable drum-reel with an inward sloped drum face and two cable guides, in accordance with certain aspects of the present invention.

FIG. 5 illustrates a partial front view of an exemplary embodiment 500 of a cable drum-reel 300 with an inward sloped drum face 330. In this embodiment, flexible camera coil 375 is being secured in inner cable guide 390 which also results in attached push-cable 360 being secured as well.

Figure 6A:
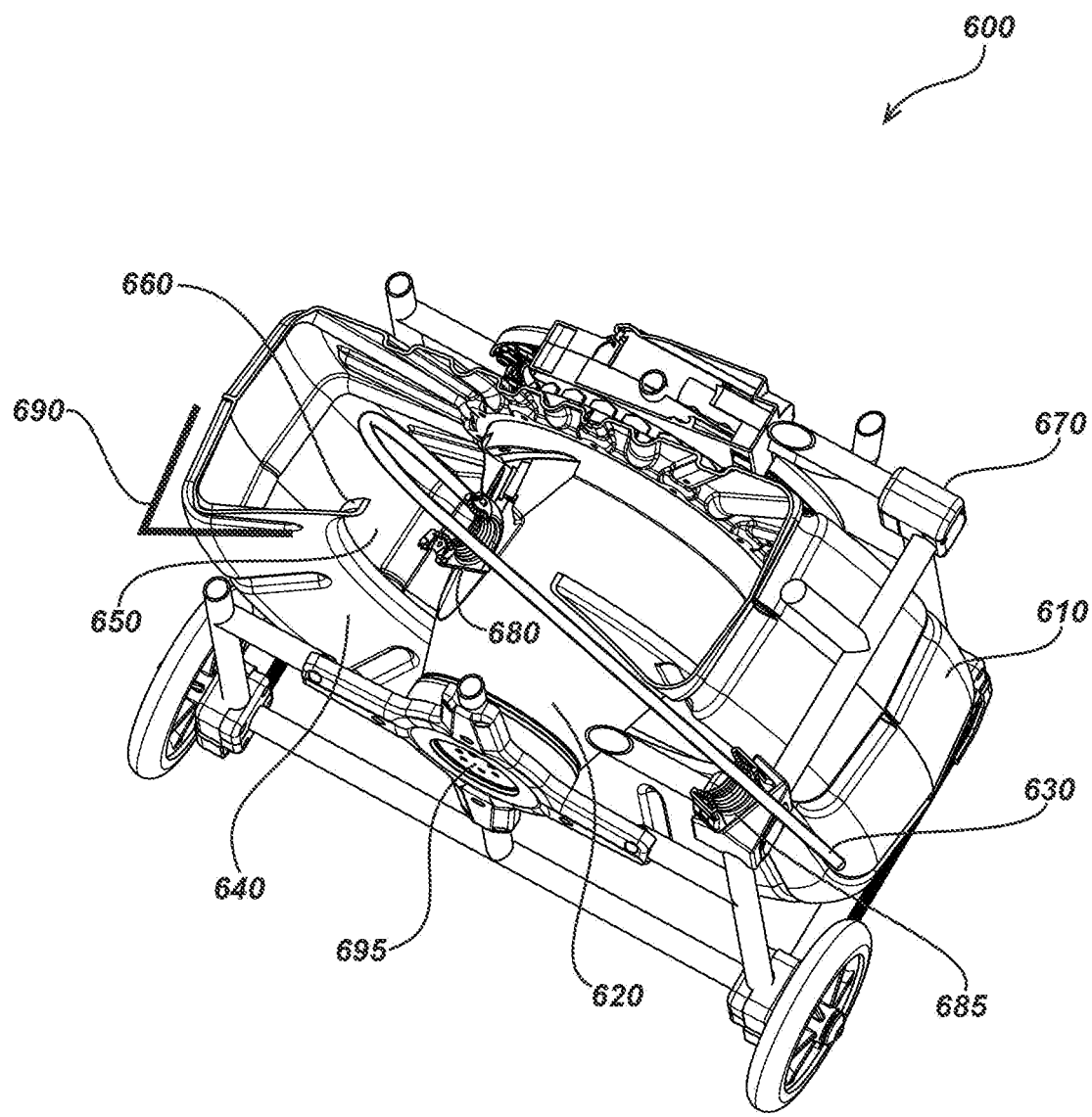
FIG. 6A is a section view illustration of an embodiment of a cable drum-reel with an inward sloped drum face and two cable guide points, in accordance with certain aspects of the present invention.

FIG. 6A illustrates details of a top down cross-sectional view of an exemplary embodiment 600 of a cable drum-reel with an inward sloped drum face. Cable drum-reel 600 typically includes an enclosure 610 to removably receive and rotatably support the drum-reel 600, and a centrally mounted projecting hub 620 for storing an encircled push-cable 630. Enclosure 610 typically includes a front drum face 640 which is shown sloped inward towards the inside of the enclosure 610. An opening 650 is provided for allowing push-cable 630 to enter and exit cable drum-reel 600 during deployment or retraction of the push-cable 630, as needed for pipe inspection. Enclosure 610 will typically have an edge or lip 660 on the inside edge of the enclosure 610. Drum lip 660 may be relatively flat or protrude inward towards the inside of the enclosure 610.

A frame 670 may be provided for holding the cable drum-reel 600 in an upright position. The frame 670 can also be positioned to allow the cable drum-reel 600 to be put in a number of different positions, for instance on its side, as needed. One or more cable guides 680 and 685 may be provided for directional guidance of the push-cable 630 into the drum enclosure 610 and onto centrally mounted axially projecting hub 620 inside drum enclosure 610.

In some embodiments, enclosure 610 may be fully enclosed, or only partially enclosed. Enclosure 610 may be made of plastic or any other material well known in the art. In other embodiments frame 670 may replace an enclosure and may also be either fully or partially enclosed. Frame 670 may be made of a light weight metal such as aluminum, plastic, or a combination of both. Other materials may be used for frame 670, and are well known in the art.

Slope angle 690 is measured relative to an axis 695 or centerline of the hub 620 about which the cable drum-reel 600 rotates. In one embodiment, slope angle 690 is chosen to optimize and/or maximize the bend radius of push-cable 630 based on the specific drum size and dimensions of cable drum-reel 600. Cable guides 680 and 685 can be angled, positioned, and spaced relative to the front drum face 640, and each other, to further optimize the angle at which push-cable 630 enters the enclosure 610, thereby providing more control over where push-cable 630 impacts the inside surface of enclosure 610 which will determine the bend radius of push-cable 630, and therefore, how it will be wound and stored inside the enclosure 610 of the cable drum-reel 600. As shown, slope angle 690 is relatively continuous and linear, however, this is for convenience only. In some embodiments, the slope could be curved, graduated (stepped) in increments, or otherwise shaped inward to guide push-cable 630 towards a specific location inside the enclosure 610, as desired.

Figure 6B:
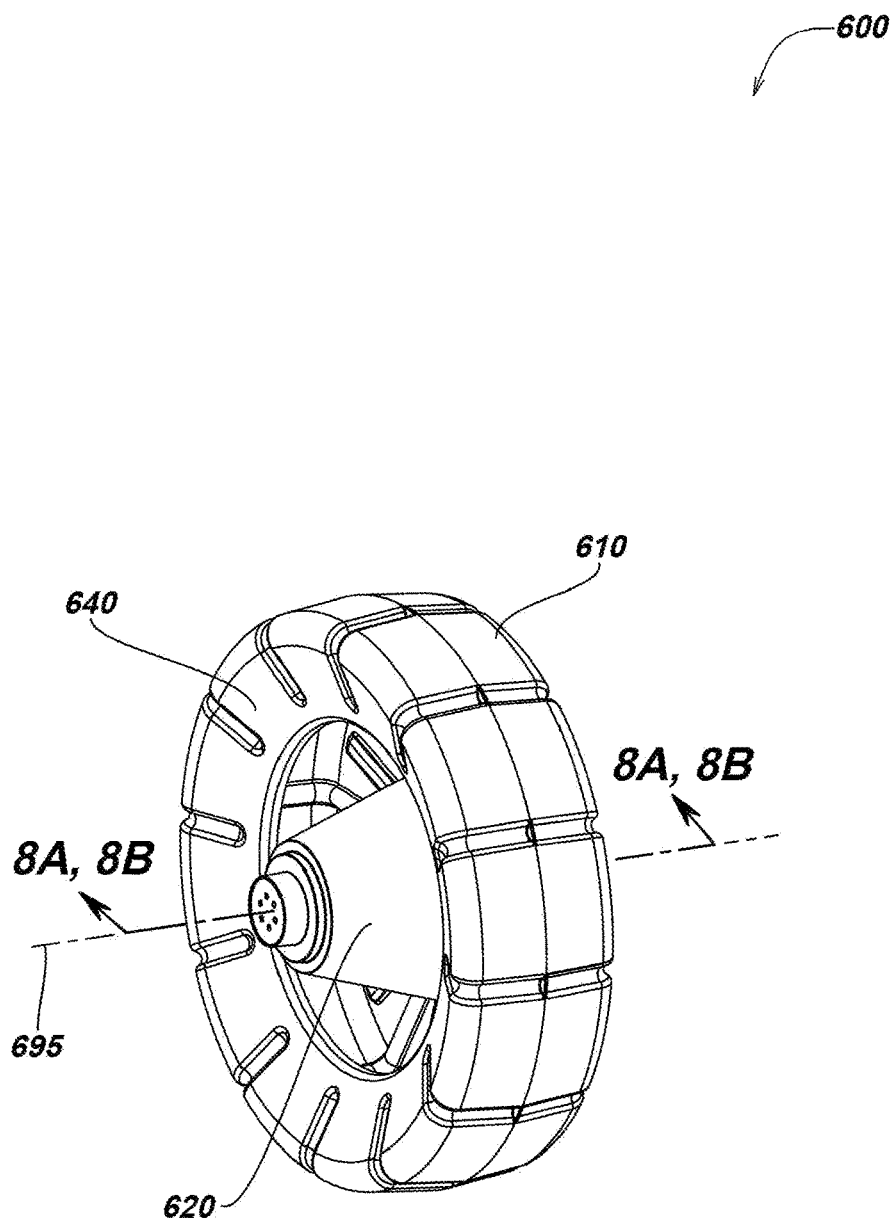
FIG. 6B is an illustration of an embodiment of a cable drum-reel with an inward sloped drum face showing details of the hub axis, in accordance with certain aspects of the present invention.

FIG. 6B illustrates details of cable drum-reel 600 with respect to hub axis 695 about which cable drum-reel 600 may rotate in either a clockwise or counter-clockwise direction, as needed for deployment or retraction of push-cable 630 (shown in FIG. 6A).

Figure 6C:
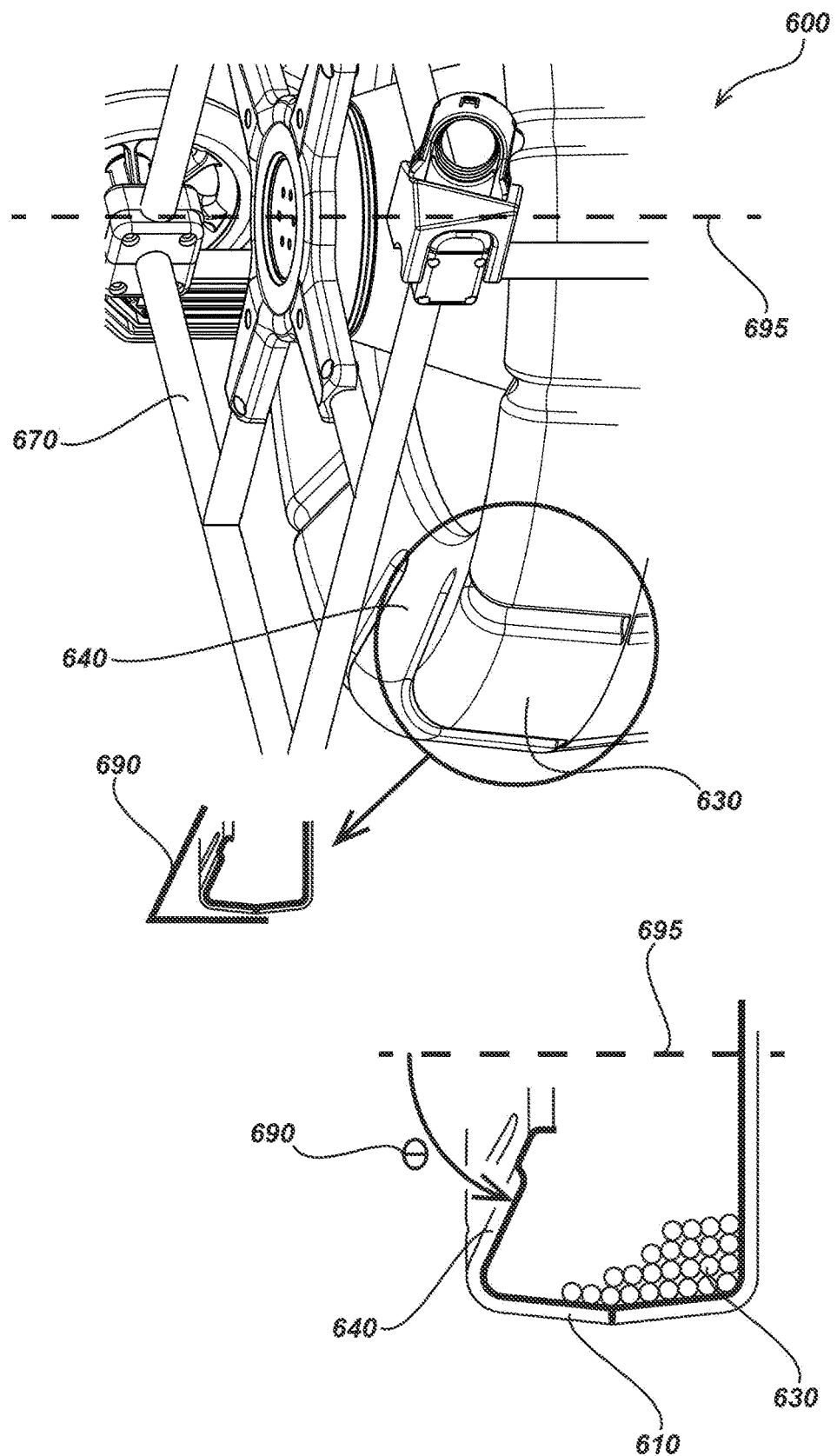
FIG. 6C is an illustration of details of an embodiment of a cable drum-reel with an inward sloped drum face showing details of the slope angle, in accordance with certain aspects of the present invention.

FIG. 6C illustrates details of cable drum-reel 600 showing details of the slope angle 690 of the front drum face 640 with respect to hub axis 695. Slope angle 690, represented for convenience as angle θ, is measured relative to the centerline about which drum hub 620 rotates, also known as the hub axis 695.

As an example, slope angle 690 may be configured to be an angle of between 5° and 45°. In other embodiments, slope angle 690 may be configured at a different angle to optimize the bend radius of push-cable 630 as it enters enclosure 610, based on the dimensions of enclosure 610, as configured for a specific push-cable 630, and/or for a specific application.

Figure 7:
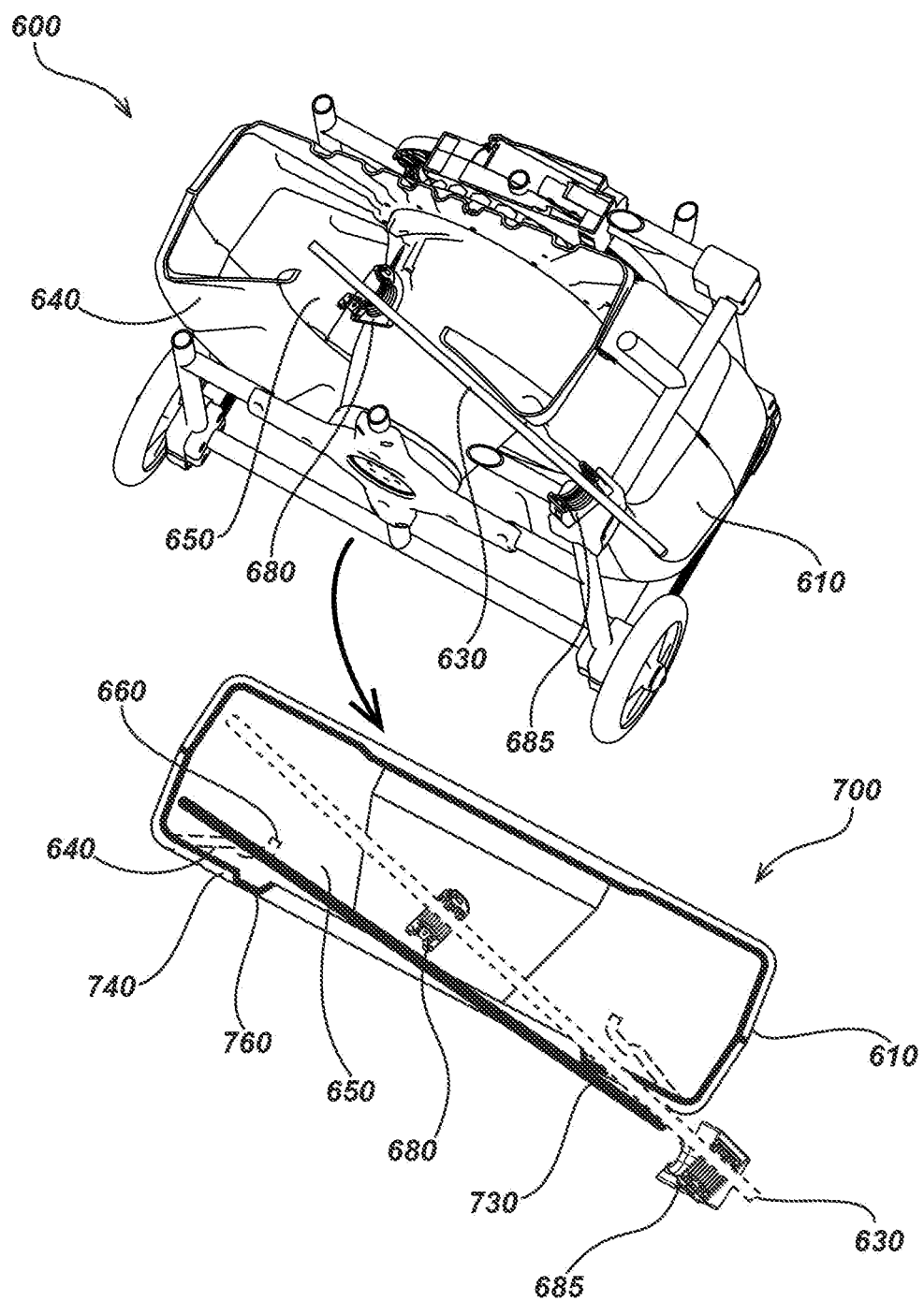
FIG. 7 is an illustration of an embodiment of a cable drum-reel with an inward sloped drum face showing the relative cable angle and bend radius of a push-cable entering the enclosure as compared to a cable drum-reel without an inward sloped drum face, in accordance with certain aspects of the present invention.

FIG. 7 illustrates details of an exemplary embodiment 700 of a cable drum-reel 600 with an inward sloped drum face 640 showing the relative cable angle and bend radius of a push-cable 630 entering the enclosure 610 as compared to a cable drum-reel without outward sloped drum face. On the top of the Drawing Sheet is cable drum-reel embodiment 600, and on the bottom of the Drawing Sheet, embodiment 700 is a representation of embodiment 600 comparing the relative cable angle and bend radius of a push-cable 630 entering the enclosure 610 via opening 650 with an cable drum-reel with an inward sloped drum face 640 (broken line), with that of a push-cable 730 entering the enclosure 610 via opening 650 with a cable drum-reel with an outward sloped drum face 740 (solid line).

Cable guides 680 and 685, in combination with inward sloped drum face 640 are used to direct or steer push-cable 630 towards a desired location in enclosure 610 in order to control the bend radius of the push-cable 630. A larger bend radius applied to push-cable 360 will reduce the forces placed on the push-cable 630.

As shown in FIG. 7, push-cable 630 enters enclosure 610 via opening 650 at a larger angle relative to inward sloped drum face 640 of enclosure 610 than the angle of push-cable 630 enters enclosure 610 with outward sloped drum face 740, for a cable drum-reel 600 and enclosure 610 of the same or similar dimensions. This allows push-cable 630 to make contact with the inside portion of enclosure 610 at a point farther back inside the enclosure 610 than cable push-cable 730 would using an outward sloped drum face 740. Since push-cable 630 and 730 are resiliently flexible, they will want to bend once they come in contact with the inside of enclosure 610. The distance that push-cable 630 and 730 will travel from the outside to the inside of enclosure 610 will be greater using an inward sloped drum face 640, thereby allowing push-cable 630 and 730 to have a larger bend radius.

Furthermore, since the entry angle of push-cable 630 into enclosure 610 is greater using an inward sloped drum face 640 than that of push-cable 730 using an outward sloped drum face 740 for a cable drum-reel 600 and enclosure 610 of the same or similar dimensions, push-cable 630, upon entry or exit into or out of enclosure 610, may avoid contact with drum-lip 760, thereby reducing friction, and wear and tear, on push-cable 630. This reduction of friction would depend on the exact entry angle chosen for push-cable 630 to enter/exit the enclosure 610. For the same entry angle, in a cable drum-reel 600 with an outward sloped drum face 740, push-cable 730 may come in contact with drum lip 760 which could over time damage the enclosure 610 and/or push-cable 730.

Figure 8A:
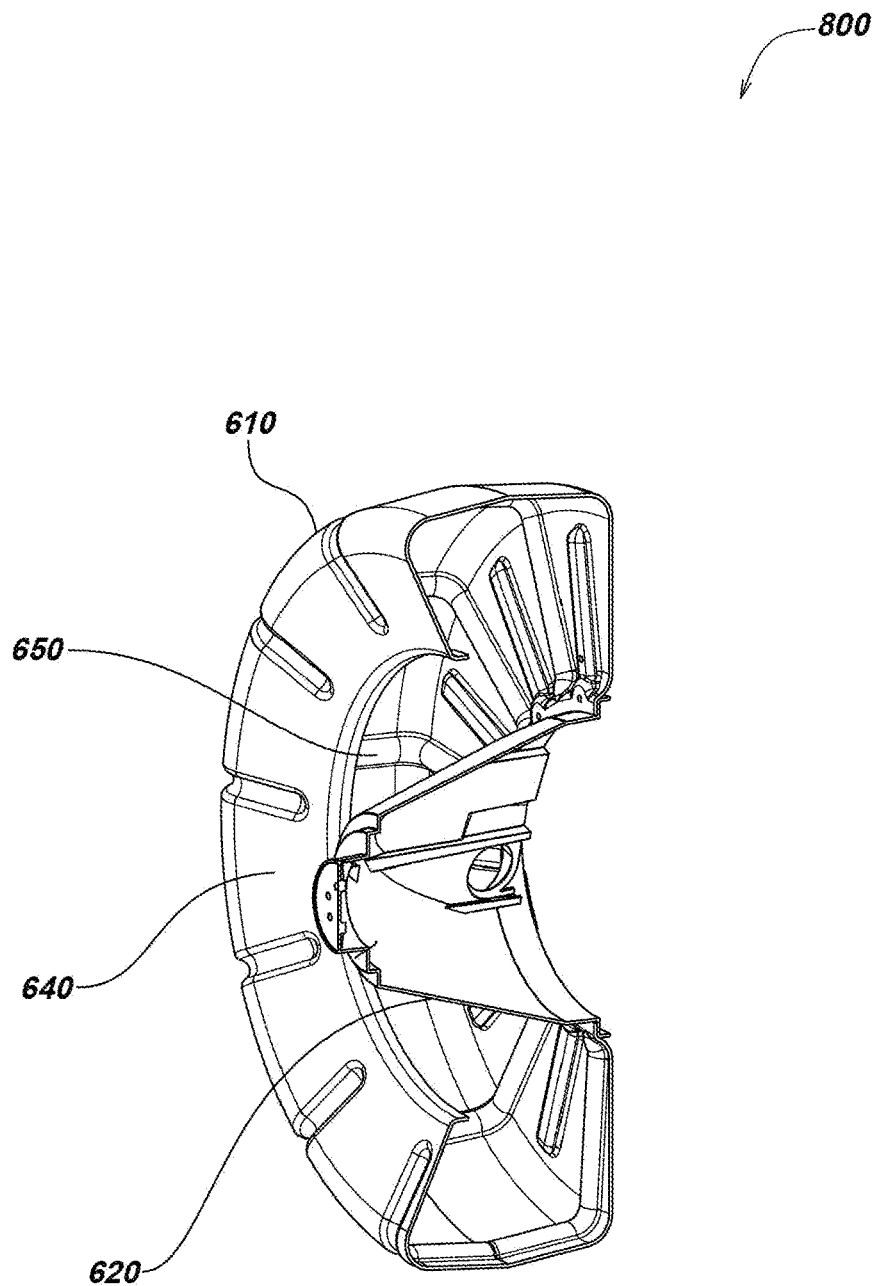
FIG. 8A is a section view illustration of an embodiment of a cable drum-reel with an inward sloped drum face with hub details, in accordance with certain aspects of the present invention.

FIG. 8A illustrates details of a cross-sectional view of an exemplary embodiment 800 of a cable drum-reel enclosure 610 with an inward sloped drum face 640 with hub details 620, in accordance with certain aspects of the present invention. Cable drum-reel enclosure 610 is configured to removably receive and rotatably support drum hub 620.

Figure 8B:
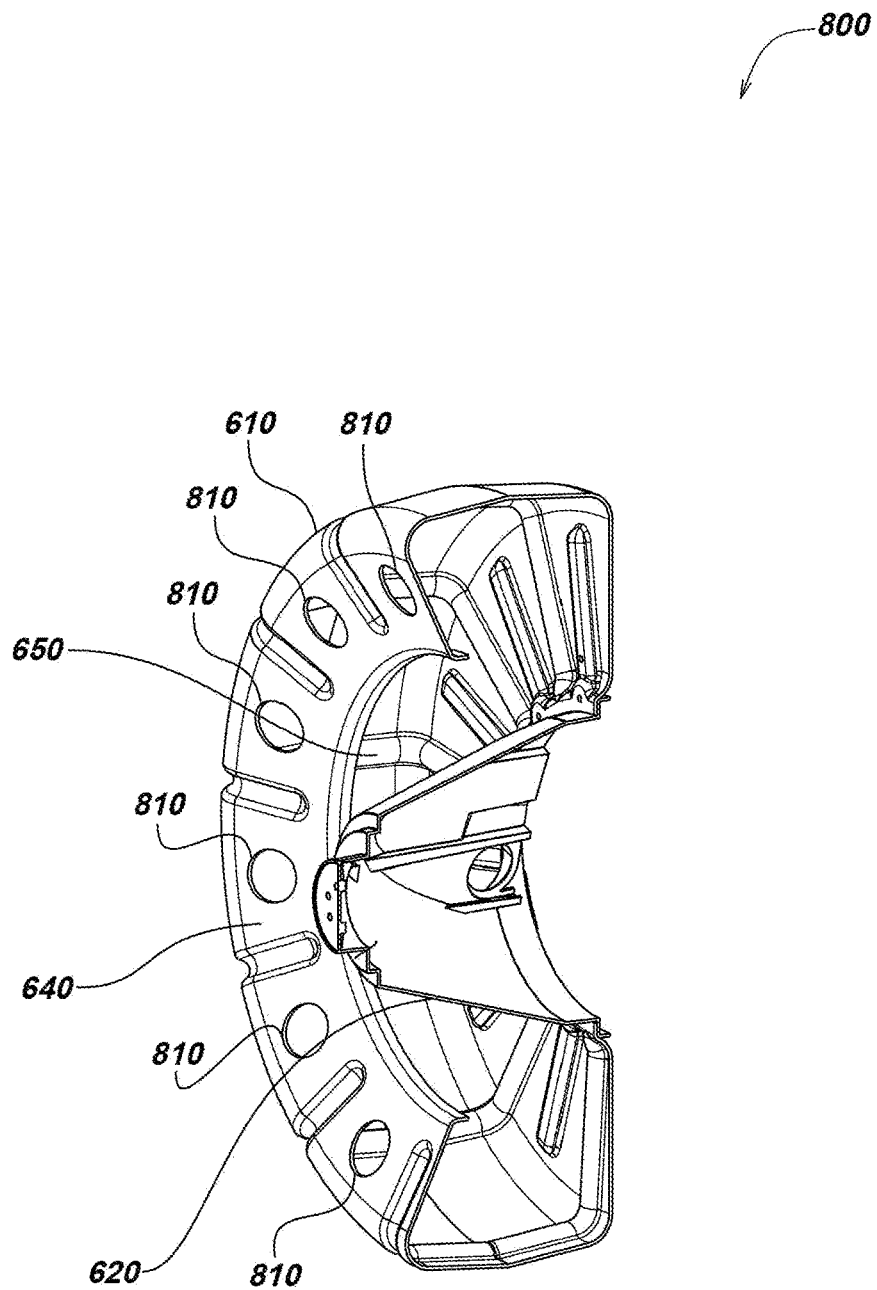
FIG. 8B is a section view illustration of an embodiment of a cable drum-reel with an inward sloped drum face with viewing or venting apertures, in accordance with certain aspects of the present invention.

FIG. 8B illustrates details of a cross-sectional view of an exemplary embodiment 800 of a cable drum-reel enclosure 610 with an inward sloped drum face 640 with hub details 620, in accordance with certain aspects of the present invention. Apertures 810 are provided on inward sloped drum face 640 to allow a user to view a cable (not shown) inside the drum-reel enclosure 610. The apertures 810 also provide additional venting for the drum-reel enclosure 610. Although the apertures 810 are shown uniform in size, shape, and spacing, this is an example only. It would be understood by one of ordinary skill in the art that the apertures 810 could be configured differently in number, shape, sizing, and spacing than shown. An added advantage of including apertures 810 would be a reduction in the overall weight of the drum-reel enclosure 610 because of a reduction in the amount of material used on the drum face 640.

Figure 9A:
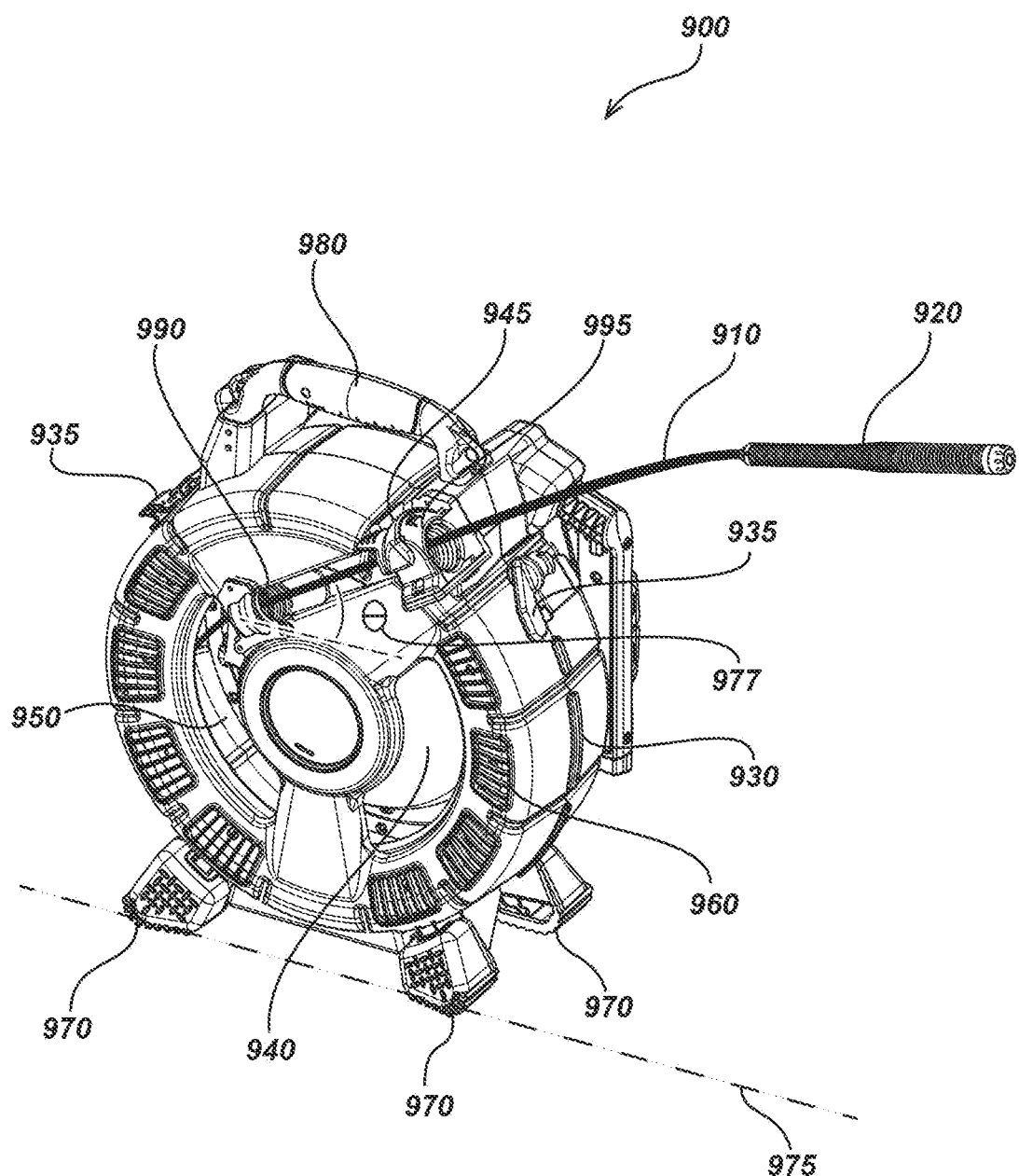
FIG. 9A is an illustration of an embodiment of a cable drum-reel with an inward sloped drum face and two cable guide points, in accordance with certain aspects of the present invention.

FIG. 9A illustrates details of an exemplary embodiment 900 of a cable drum-reel with an inward sloped drum face. Cable drum-reel 900 may be used for storing, deploying, and/or retracting a push-cable 910 with a distally attached camera 920, as needed for pipe or cavity inspection. Cable drum-reel 900 typically includes an enclosure 930 to removably receive and rotatably support cable drum-reel 900 and a centrally mounted projecting hub 940 for storing an encircled push-cable 910. Enclosure 930 may include an opening 950 on the front drum face 960 for allowing a cable or push-cable 910 to enter or exit the enclosure 930. The front drum face 960 is sloped inward towards the inside of the drum enclosure 930 at a specified slope angle.

The enclosure 930 may include one or more stabilizing feet 970 for positioning cable drum-reel 900 in an upright or other position. A handle 980 may be provided for allowing easy and convenient positioning and transport of the cable drum-reel 900. One or more cable guides, for example inner cable guide 990 and outer cable guide 995 may be provided for directional guidance of the push-cable 910 into the drum enclosure 930 and onto a centrally mounted axially projecting hub 940 inside the drum enclosure 930.

Cable guides 990 and 995 may be positioned at different heights measured from a horizontal line created by stabilizing feet 970 in order to create a push-cable entry/exit angle θ 977 at which push-cable 910 enters or exits drum enclosure 930 during deployment or retraction. In one embodiment, angle entry/exit angle θ 977 may be a positive angle, meaning it is at an angle that allows push-cable 910 to exit and enter the drum at an entry/exit angle θ 977 greater than zero with respect to horizontal line 975. This allows the cable to be inserted into the drum and retracted from the drum with less force than would be required than if entry/exit angle θ 977 was zero degrees (i.e. parallel to horizontal line 975).

One or more cable guide latches 945 may be provided for securing push-cable 910 in a desired position. In some embodiments, one or more latches 935 or other types of fasteners which are well known in the art, may be provided to allow opening and closing of the enclosure 930 for allowing access to push-cable 910 or other components inside the enclosure 930.

Figure 9B:
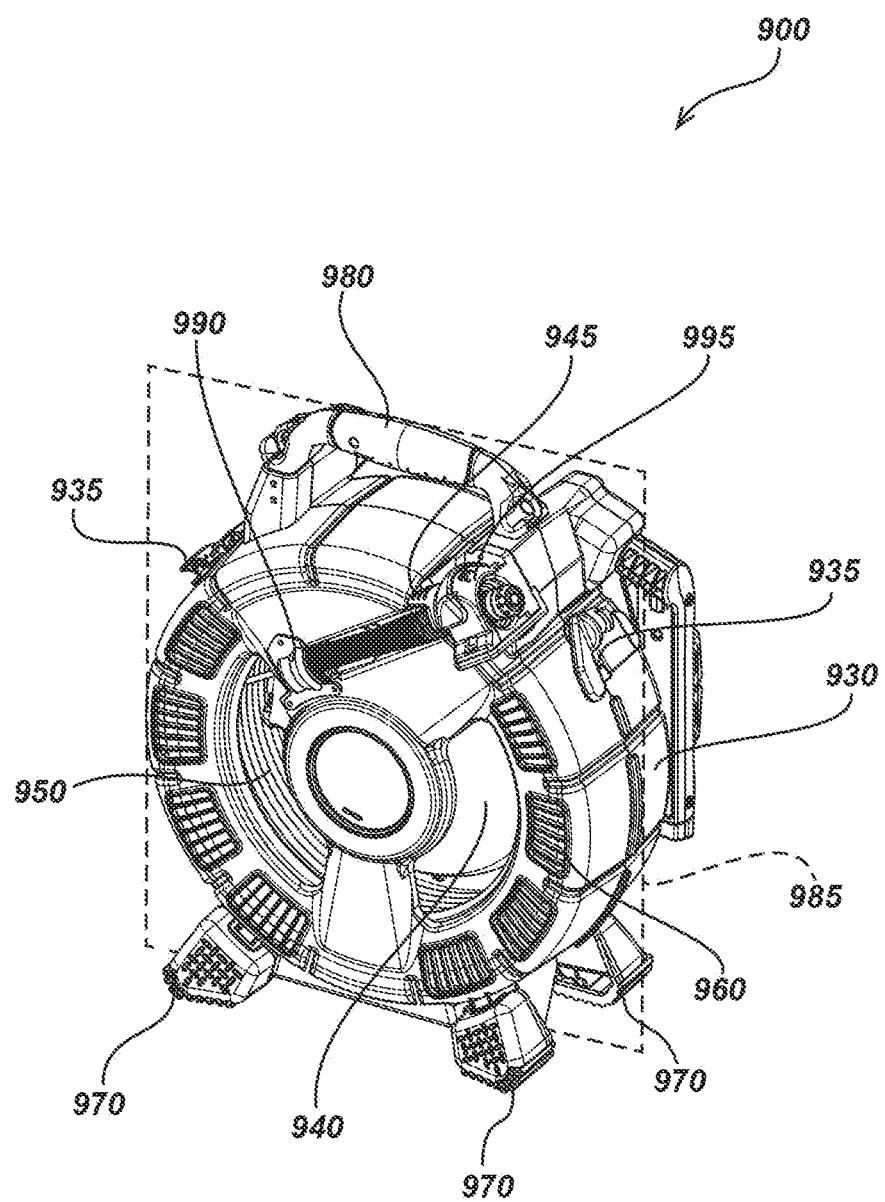
FIG. 9B is an illustration of an embodiment of a cable drum-reel with an inward sloped drum face and two cable guide points with a camera in a stored position, in accordance with certain aspects of the present invention.

FIG. 9B illustrates details of an exemplary embodiment 900 of a cable drum-reel with an inward sloped drum face with camera 920 in a stored position. In one embodiment, outer cable guide 995 may be relatively close to the outside of enclosure 930. This allows camera 920 to be stored very close to the enclosure 930, thereby offering more protection to camera 920 when being stored and/or transported. Furthermore, storing the camera closer to enclosure 930 creates a smaller overall profile 985 of cable drum-reel 900 allowing it to be transported safer and more easily, especially in tighter spaces, than it would be if cable guide 995, and thus camera 930 were positioned further away from enclosure 930.

Figure 9C:
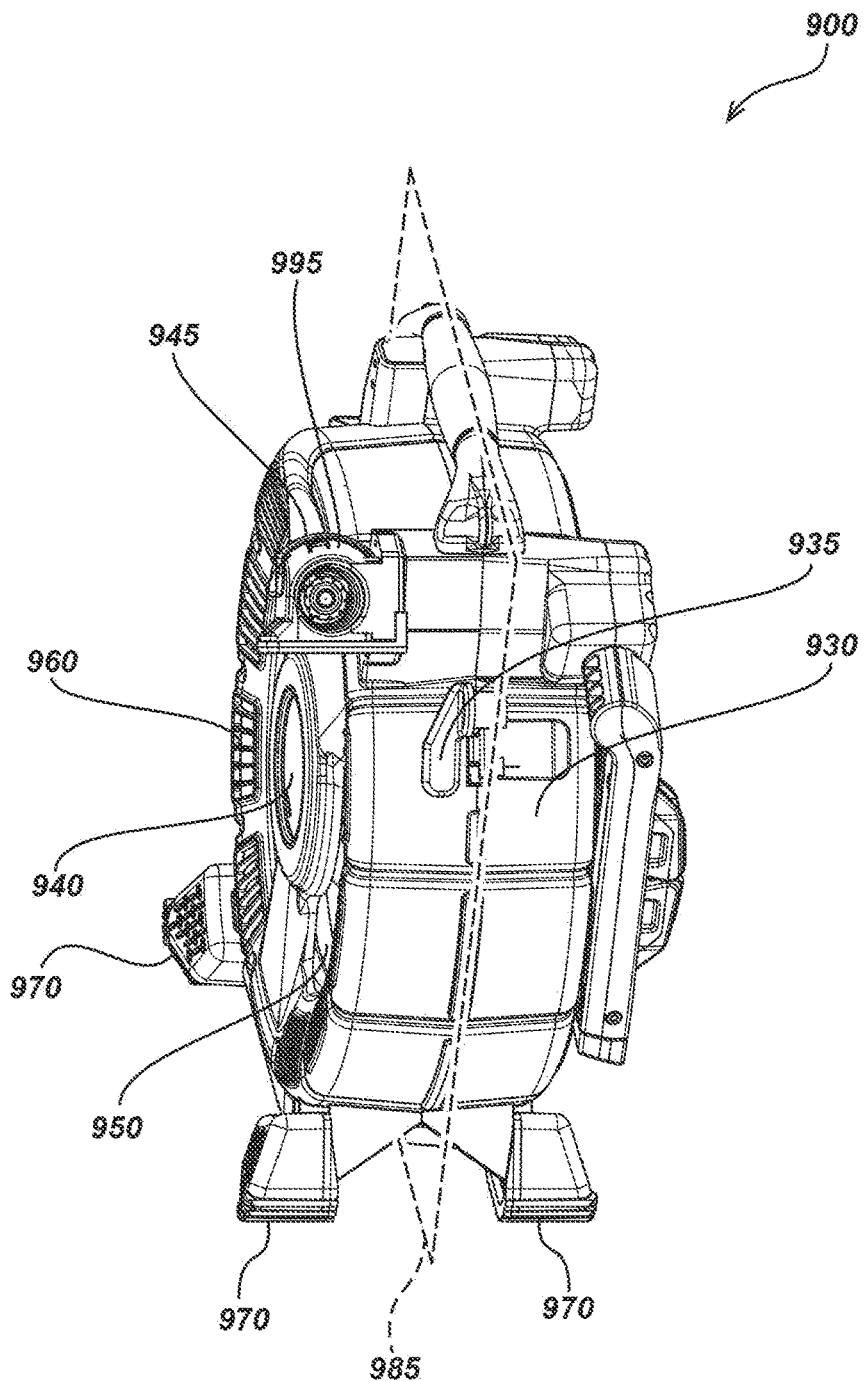
FIG. 9C is a head-on view illustration of an embodiment of a cable drum-reel with an inward sloped drum face and two cable guide points with a camera in a stored position, in accordance with certain aspects of the present invention.

FIG. 9C illustrates details of an exemplary embodiment 900 of a cable drum-reel with an inward sloped drum face with camera 920 in a stored position from a head-on view. From this view it can be seen that camera 920 is stored relatively flush with cable drum-reel enclosure 930. This creates a smaller overall cable drum-reel profile 985, thereby helping to protect camera 920 during storage and transport.

Figure 10:
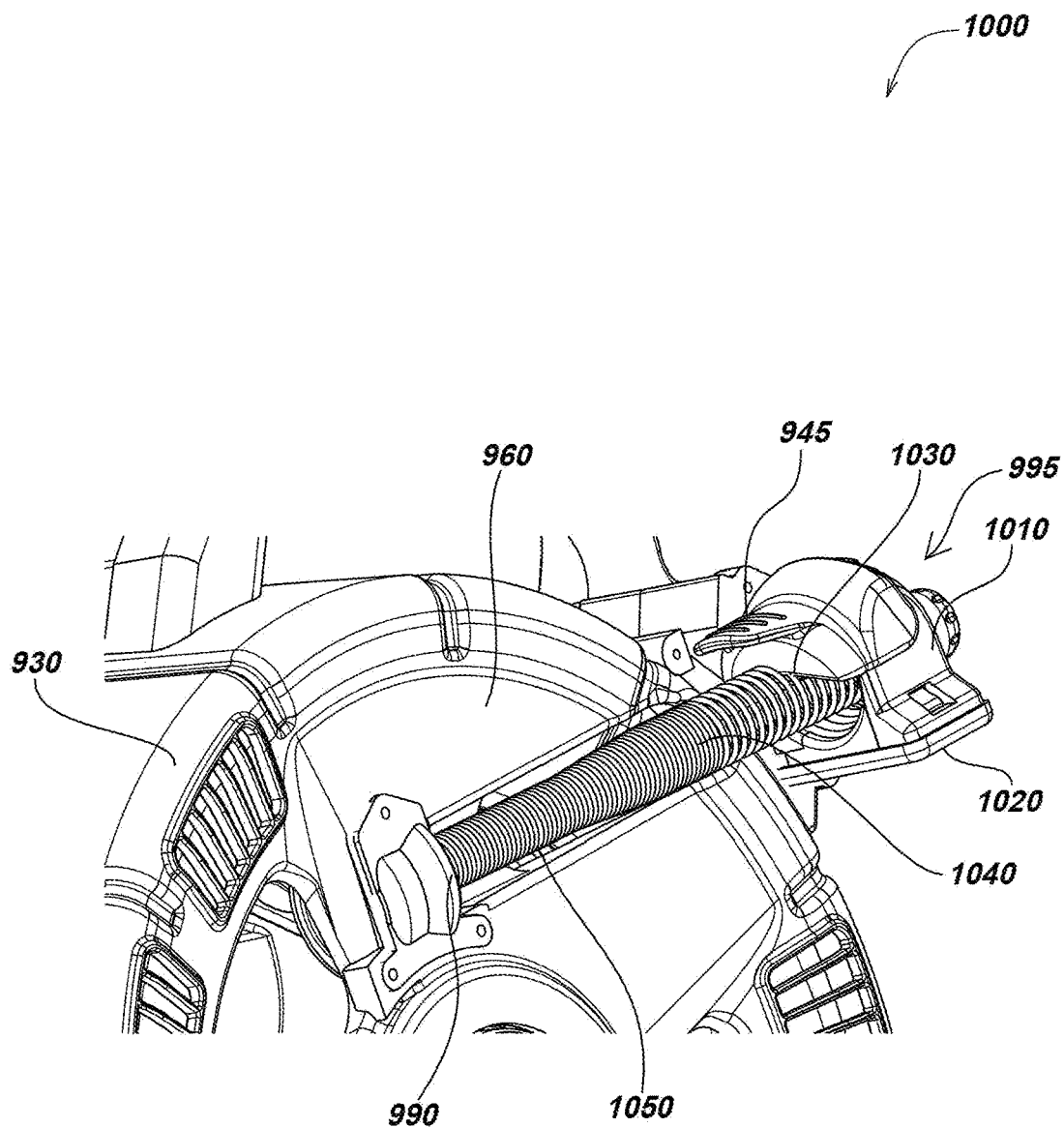
FIG. 10 is a partial view illustration of an embodiment of a cable drum-reel with an inward sloped drum face and two cable guide points, in accordance with certain aspects of the present invention.
Figure 11:
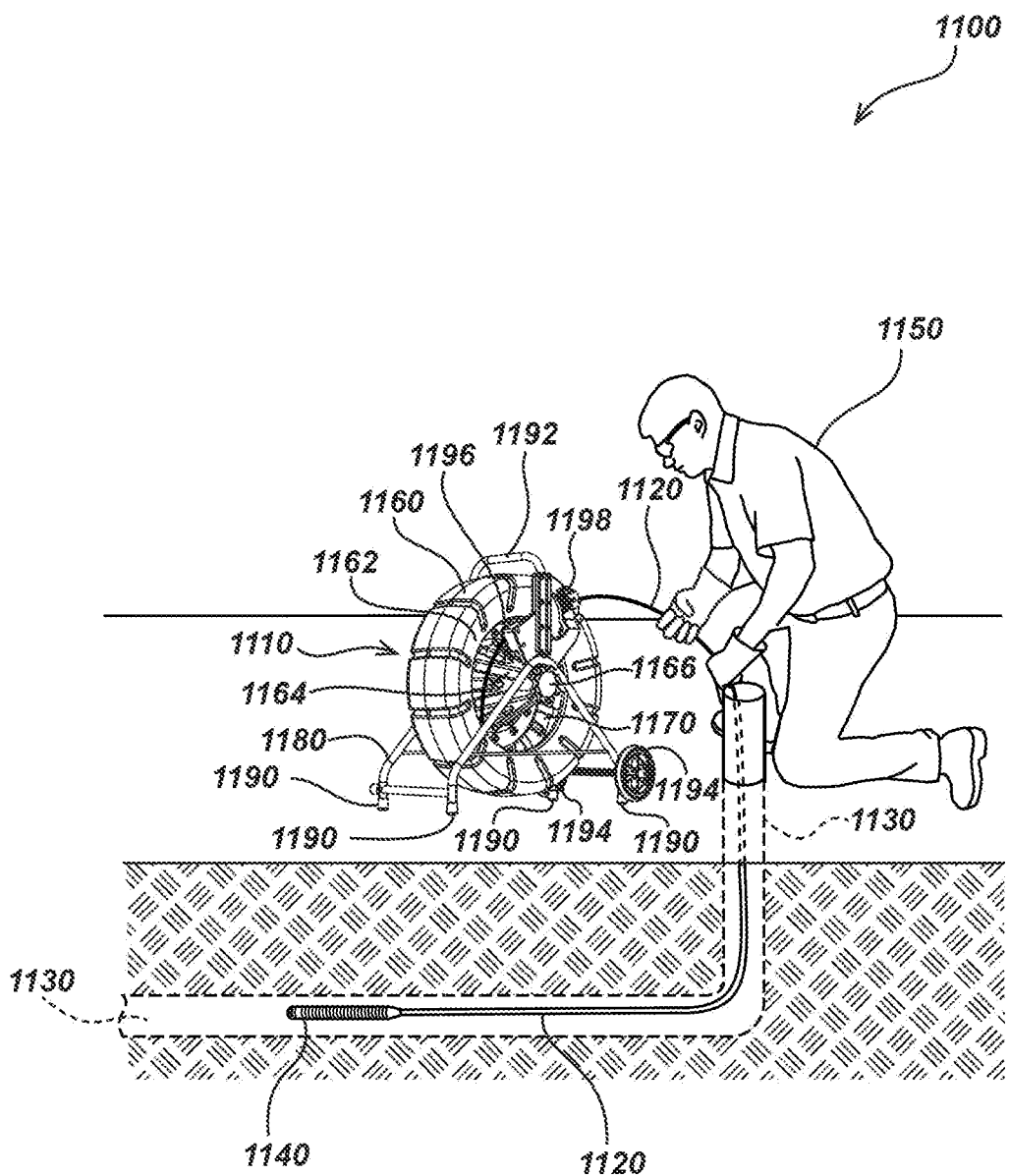
FIG. 11 is an illustration of an embodiment of a typical method of feeding a cable or hose from a cable drum-reel with an inward sloped drum face, in accordance with certain aspects of the present invention.

FIG. 10 shows a partial view illustration of an exemplary embodiment 1000 of an inward sloped drum face 960 and two cable guide points 990 and 995, in accordance with certain aspects of the present invention. In this embodiment, cable guide point 990 may be an inner cable guide located away from the external circumference of drum enclosure 930, and cable guide 995 may be an outer cable guide located closer to the external circumference of drum enclosure 930. Outer cable guide 995 may include an external cover 1010 and a base 1020 that may be integrated into the enclosure 930. Cable guide latch 945 may include a small protrusion 1030, similar to a blade, which may act as a brake by providing pressure on the exterior of a push-cable when latch 945 is closed. It may be constructed of metal, plastic, or any other material well known in the art. Cable guide latch 945 may be hinged (not shown) to allow it to open and close around a push-cable threaded through cable guide opening 1040. Cable guide latch 945 may be configured to engage open coils in the spring, thereby, preventing the push-cable (not shown) from auto spooling out of the drum enclosure 930 while being carried.

An opening or window 1050 may be provided for allowing a push-cable (not shown) to be inserted from outer cable guide 995 through inner cable guide 990, through front face 960 and into the inside of cable drum-reel enclosure 950.

FIG. 1 illustrates details of an exemplary embodiment of a system 1100 for pipe or cavity inspection. System 1100 may include a cable drum-reel 1110 used for storing, deploying and/or retracting one or more cables and/or hoses 1120 for inspecting a pipe or cavity 1130. The one or more cables and/or hoses 1120 may include a push-cable 1120 with a distally mounted camera 1140 for allowing a user 1150 to inspect a pipe or cavity 1130. Cable drum-reel 1110 typically includes an enclosure 1160 to removably receive and rotatably support the drum-reel 1110, and a centrally mounted projecting hub 1164 for storing an encircled cable or hose 1120. A hand-tightened knob, or hand-brake 1166 may be provided to allow a user to set friction on the hub drum pivot point (not shown), to prevent the push-cable 1120 from auto-spooling from the cable drum-reel 1110. Enclosure 1160 includes a front drum face 1162 which is sloped inward towards the inside of the enclosure 1160. An opening 1170 is provided for allowing push-cable 1120 to enter and exit cable drum-reel 1110 during deployment or retraction. Cable drum-reel 1110 may include a frame 1180, stabilizing feet 1190, and a handle 1192 and/or wheels 1194 for allowing a user 1150 to easily and conveniently relocate the cable drum-reel 1110 as needed.

One or more cable guides 1196 and 1198 may be provided for additional guidance of the push cable 1120 into and out of cable drum-reel 1110. In one embodiment, cable guide 1196 is an inner cable guide positioned near the inside edge of the drum opening 1170, and cable guide 1198 is an outer cable guide positioned near the outside perimeter of the front face 1162 of the cable drum-reel enclosure 1160. The cable guides 1196 and 1198 may be attached in various locations on the frame 1180, or on the enclosure 1160. They may be permanently mounted or removably attachable.

Figure 12:
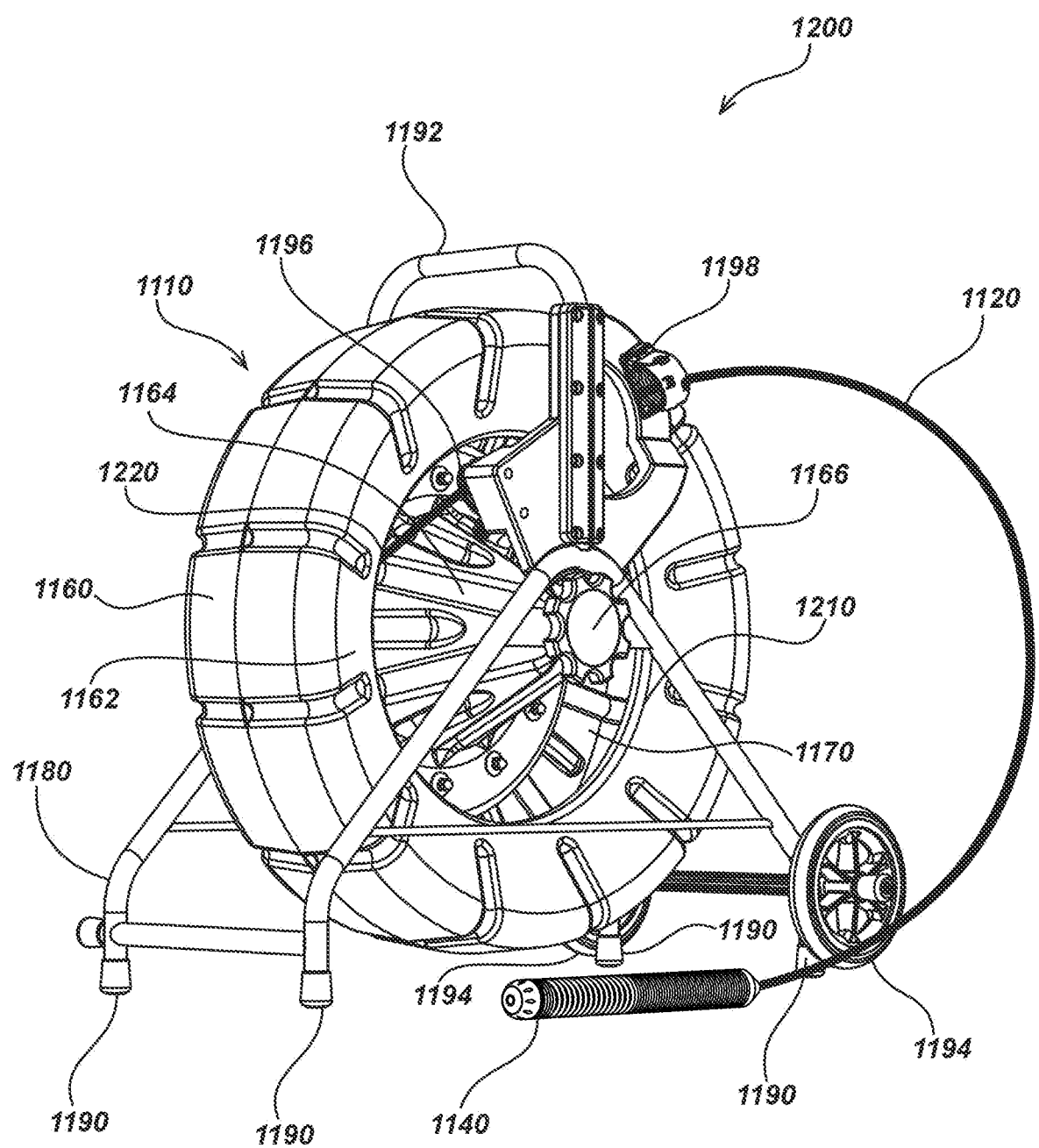
FIG. 12 is an illustration of an embodiment of a cable drum-reel with an inward sloped drum face, in accordance with certain aspects of the present invention.

FIG. 12 illustrates details of an exemplary embodiment 1200 of a cable drum-reel 1110, as known in the prior art. An enclosure 1160 with an opening 1170 on the front drum face 1162 may be provided. The front drum face 1162 is shown sloped inward towards the enclosure 1160. Front drum face 1162 may include an inner edge or lip 1210 which may be relatively flat or protrude inwardly towards enclosure 1160. A cable entry/exit point 1220 is shown at one possible location on the front drum face 1162, at the point where the cable enters or exits the enclosure 1160.

In one embodiment, the position and angle of cable guides 1196 and 1198 relative to each other, the inward slope angle of the front face of the enclosure 1162, and the distance of cable guides 1196 and 1198 relative to the front face 1162, may be chosen such that push-cable 1120 enters or exits entry-exit point 1220 without causing rubbing and/or friction on surface edge or lip 1210 of the drum and to optimize and maximize the location at which push-cable 1120 comes in contact with the inside of the enclosure 1160 by controlling the bend radius of push-cable 1120 inside the drum enclosure 1160.

The scope of the invention is not intended to be limited to the aspects shown herein but are to be accorded the full scope consistent with the disclosures herein and their equivalents, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b, a and c; b and c; and a, b and c.

The previous description of the disclosed aspects is provided to enable any person skilled in the art to make or use embodiments of the present invention. Various modifications to these aspects will be readily apparent to those skilled in the art, and the generic principles defined herein may be applied to other aspects without departing from the spirit or scope of the disclosure. Thus, the disclosure is not intended to be limited to the aspects shown herein but is to be accorded the widest scope consistent with the following claims and equivalents.

We claim:

1. A pipe inspection system, comprising:
   a cable storage drum including a centrally mounted axially projecting hub; and
   an enclosure to removably receive and rotatably support the cable storage drum, the enclosure comprising an inside portion and an outside portion;
   the outside portion comprising a front face and a rear face, wherein the front face has an opening, and wherein at least a portion of the front face is sloped inward toward the inside portion of the drum at an angle measured relative to a rotational axis of the drum and selected to optimize a bend radius of a cable wound thereon.

2. The system of claim 1, wherein the cable comprises a resilient push-cable with a plurality of conductors stored in the cable storage drum in a plurality of coils encircled on the centrally mounted and axially projecting hub.

3. The system of claim 2, further comprising a camera head operatively connected to a distal end of the push-cable.

4. The system of claim 3, further comprising a frame for supporting the cable storage drum.

5. The system of claim 1, further comprising one or more cable guide points, wherein the cable guide points are shaped and sized so as to direct the push-cable in or out of one or more cable guide points.

6. The system of claim 1, wherein the one or more cable guide points are removably attachable to the frame.

7. The system of claim 5, wherein the one or more cable guide points comprise at least two separated cable guide points.

8. The system of claim 7, wherein a first of the guide points is an inner guide point positioned adjacent to the inside edge of the drum opening, and a second of the guide points is an outer guide point positioned adjacent to the outside perimeter of the front face of the cable storage drum.

9. The system of claim 8, wherein the first guide point and the second guide point are removably attachable to the frame.

10. The system of claim 5, wherein the one or more cable guide points comprise a single elongated cable guide comprising a proximal end and distal end, wherein the proximal end is an inner guide point positioned adjacent to the inside edge of the drum opening, and the distal end is an outer guide point positioned adjacent to the outside perimeter of the front face of the cable storage drum.

11. The system of claim 1, wherein the front face is sloped inwardly at an angle of between about 5° and about 45°.

12. The system of claim 1, wherein the front face is sloped inwardly at an angle of about 20°.

13. A pipe inspection system, comprising:
    a cable storage drum including a centrally mounted axially projecting hub;
    an enclosure to removably receive and rotatably support the cable storage drum, the enclosure comprising an inside portion and an outside portion;
    the outside portion comprising a front face and a rear face, wherein the front face has an opening, and wherein at least a portion of the front face is sloped inward toward the inside portion of the drum; and
    a resilient push-cable with a plurality of conductors stored in the cable storage drum in a plurality of coils encircled on the centrally mounted and axially projecting hub, wherein the front sloped face is sloped at an angle measured relative to a rotational axis of the drum and selected to optimize a bend radius of a resilient cable wound thereon.

14. The system of claim 13, further comprising an external frame for supporting the cable storage drum; and
    one or more cable guide points removably attachable to the frame, wherein the push-cable is directed into or out of the cable guide point when retracting or deploying the push-cable into or out of the cable storage drum.

15. The system of claim 14, wherein the one or more cable guide points comprise at least two separated cable guide points.

16. The system of claim 14, wherein the frame comprises one or more feet for stabilizing the cable storage drum.

17. The system of claim 14, wherein the frame comprises at least one handle; and
    at least one wheel for carrying or positioning the cable storage drum.

18. The system of claim 14, wherein at least one of the one or more cable guide points includes a releasable latching mechanism for locking the push cable in place.

19. The system of claim 13, wherein the front face is sloped inwardly at an angle of between about 5° and about 45°.

20. The system of claim 13, where in the front face is sloped inwardly at angle of about 20°.

21. A pipe inspection system, comprising:
    a cable storage drum including a centrally mounted axially projecting hub; and
    a frame to removably receive and rotatably support the cable storage drum, the frame comprising an inside portion and an outside portion, wherein the outside portion comprises an opening;
    a front face either attached or integral to the outside of the frame, wherein the face is sloped inward toward the inside portion of the drum at an angle measured relative to a rotational axis of the drum and selected to optimize a bend radius of a cable wound thereon.

22. A cable storage drum comprising:
    an enclosure with an integral axially projecting hub;
    the enclosure comprising an inside portion and an outside portion, wherein the outside portion comprises a front face and a rear face, wherein the front face has an opening, and wherein at least a portion of the front face is sloped inward toward the inside portion of the drum at an angle measured relative to a rotational axis of the drum and selected to optimize a bend radius of a cable wound thereon.

* * * * *